United States Patent [19]
Ramström et al.

[11] Patent Number: 5,960,004
[45] Date of Patent: Sep. 28, 1999

[54] MODULAR APPLICATION SOFTWARE FOR TELECOMMUNICATIONS EXCHANGES FOR PROVIDING ALL END USER SERVICES TRAFFIC HANDLING AND CHARGING REQUIREMENTS OF AN APPLICATIONS TYPE

[75] Inventors: Sune Ramström, Stockholm; Johan Törnström, Haninge; Arne Åkerfeldt, Huddinge; Lars Bengtsson, Trångsund, all of Sweden; Steve Doe, Shoreham-By-Sea, United Kingdom; Jan Gustafsson, Huddinge, Sweden; Svante Haraldson, Hägersten, Sweden; Lars Kari, Enskede, Sweden; Chris Kemp, Brighton, United Kingdom; Jörgen Lantto, Tullinge, Sweden; Johan Lindström, Stockholm, Sweden; Bertil Nilsson, Skärholmen, Sweden; Peter Ohman, Enebyberg, Sweden; Jan van der Meer; Paul van Hal, both of Oosterhour, Netherlands

[73] Assignee: Telefonaktiebolaget L M Ericsson (publ), Stockholm, Sweden

[21] Appl. No.: 08/781,801

[22] Filed: Jan. 10, 1997

Related U.S. Application Data

[63] Continuation of application No. 08/250,337, May 26, 1994, Pat. No. 5,691,973, which is a continuation of application No. 07/723,166, Jun. 28, 1991, abandoned.

[51] Int. Cl.$^6$ .................................................. H04J 3/16
[52] U.S. Cl. .................... 370/469; 370/400; 370/467
[58] Field of Search .................................. 370/328, 349, 370/385, 389, 401, 410, 467, 469, 496, 522, 465, 400

[56] References Cited

U.S. PATENT DOCUMENTS

| | | | |
|---|---|---|---|
| 3,969,701 | 7/1976 | Hemdal | 340/172.5 |
| 4,499,336 | 2/1985 | Krikor et al. | 179/18 |
| 4,530,090 | 7/1985 | Priamo et al. | 370/58 |
| 4,683,584 | 7/1987 | Chang et al. | 379/269 |
| 4,686,701 | 8/1987 | Ahmad et al. | 379/211 |
| 4,689,815 | 8/1987 | Grewal et al. | 379/269 |
| 4,694,487 | 9/1987 | Chang et al. | 379/269 |
| 4,695,977 | 9/1987 | Hansen et al. | 364/900 |
| 4,720,854 | 1/1988 | Sand | 379/269 |
| 4,893,307 | 1/1990 | McKay et al. | 370/389 |
| 4,903,258 | 2/1990 | Kuhlmann et al. | 370/58.2 |
| 4,914,585 | 4/1990 | Packard et al. | 364/200 |
| 4,943,932 | 7/1990 | Lark et al. | 364/513 |
| 4,993,017 | 2/1991 | Bachinger et al. | 370/58.2 |
| 5,018,097 | 5/1991 | Kuhlmann et al. | 364/900 |
| 5,021,949 | 6/1991 | Morten et al. | 370/389 |
| 5,047,923 | 9/1991 | Elstner et al. | 364/200 |
| 5,093,825 | 3/1992 | Helsmoortel et al. | 370/58.2 |
| 5,119,366 | 6/1992 | Ardon et al. | 370/54 |
| 5,278,890 | 1/1994 | Beeson, Jr. et al. | 370/328 |

FOREIGN PATENT DOCUMENTS

| | | |
|---|---|---|
| 0 303 869 | 2/1989 | Germany . |
| 420432A2 | 4/1991 | United Kingdom . |

OTHER PUBLICATIONS

Gitlin, et al., *Data Networking: An Issue Overview* AT&T Technical Journal, vol. 67, No. 6, pp. 3–6 (Nov./Dec. 1988).

(List continued on next page.)

*Primary Examiner*—Dang Ton
*Assistant Examiner*—Shick Hom
*Attorney, Agent, or Firm*—Jenkens & Gilchrist P.C.

[57] ABSTRACT

A software architecture for use in program controlled telecommunications switching exchanges in which application modules are employed to provide services to users of a particular communications application. Resource modules provide specific functional elements of communications services to the application modules by having access to and control over the exchange hardware. Network protocols provide communication between the application modules within the exchange and interfaces provide communications between the resource modules and between application modules and resource modules within the exchange.

25 Claims, 16 Drawing Sheets

OTHER PUBLICATIONS

Gerwirtz, et al., *Data Networking Directions* AT&T Technical Journal, vol. 67, No. 6, pp. 7–22 (Nov./Dec. 1988).

Boakye, et al., *T&T Data Networking Architecture* AT&T Technical Journal, vol. 67, No. 6, pp. 23–24 (Nov./Dec. 1988).

Chernicoff, *Summoning Your Resources, Macintosh Revealed, vol. One: Unlocking the Toolbox*, pp. 257–299 (Haden Book Co.).

Inoue, et al., *Nodal System Architecture, NNT Review* vol. 3, No. 2, pp. 70–75 (Mar. 1991).

Dent, *A Distributed Call Processing Architecture for Use Within the Intelligent Network* IEEE Publications (1990).

Doshi, et al., *Congestion Control in ISDN Frame–Relay Networks* AT&T Technical Journal, vol. 67, No. 6, pp. 35–46 (Nov./Dec. 1988).

Sheng, *Virtual Private–Line Performance and Customer Cost Impacts*, AT&T Technical Journal, vol. 67, No. 6, pp. 47–68 (Nov./Dec. 1988).

Anderson, et al., *Reuse of Softward Modules* AT&T Technical Journal, pp. 71–76 (Jul./Aug. 1988).

ETSI STC NA 4.3 TMN–OMM, Customer Administration; 3d working draft OMM rapporteurs meeting in Bern/Switzerland, Apr. 1991.

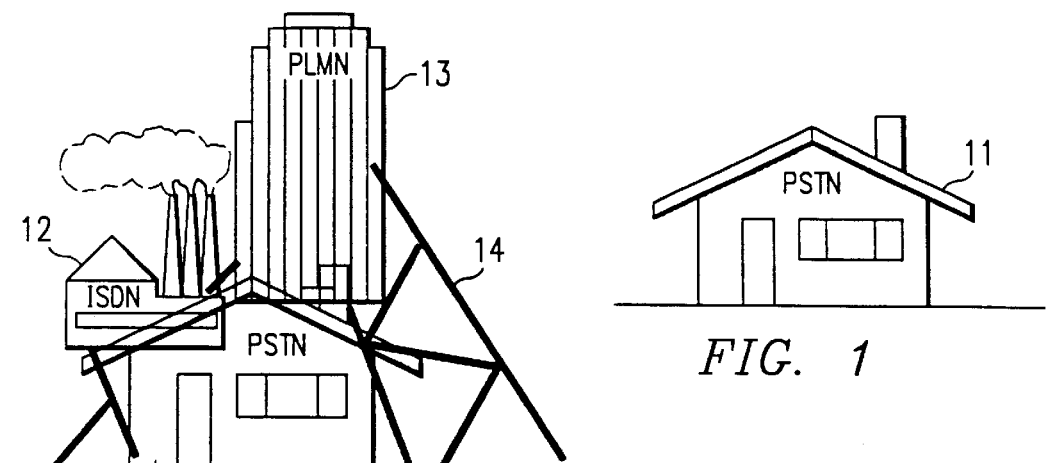
FIG. 1
FIG. 2
(PRIOR ART)
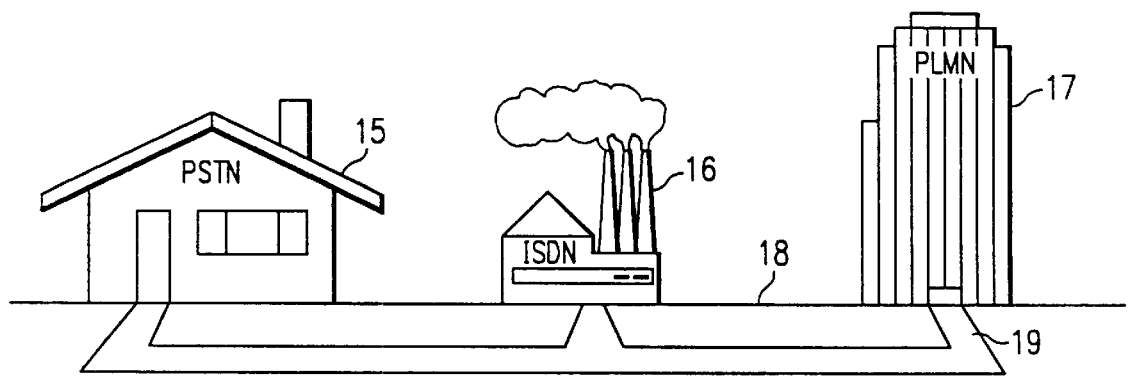
FIG. 3
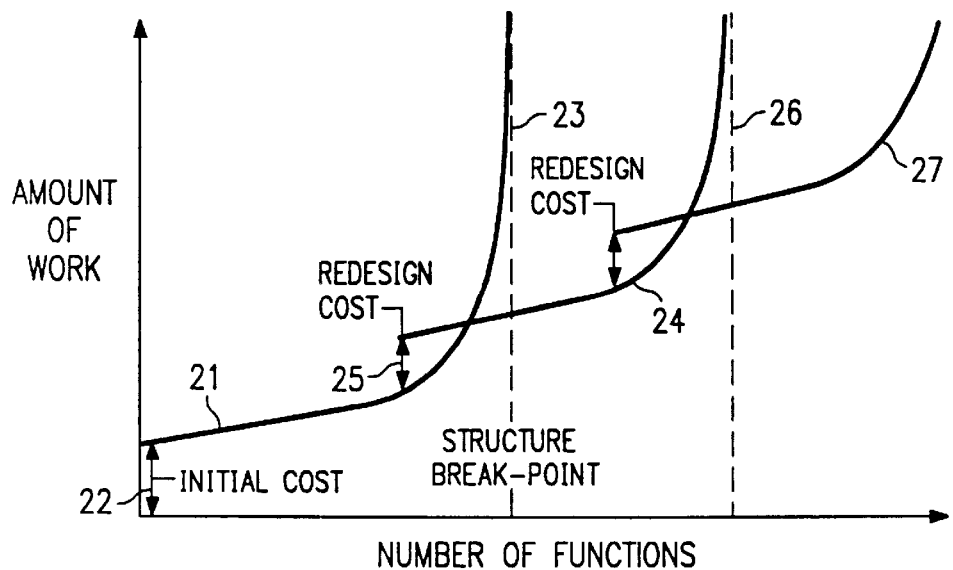
FIG. 4

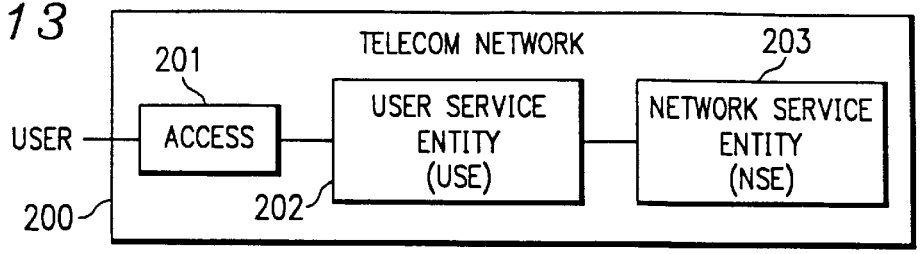
FIG. 13
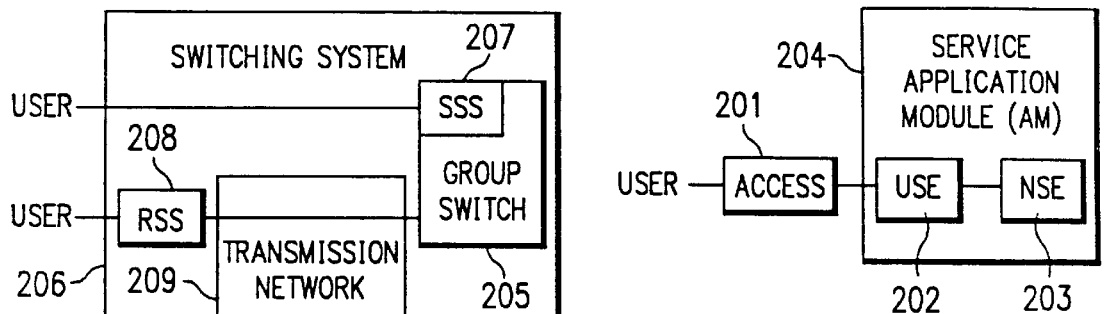
FIG. 15
FIG. 14
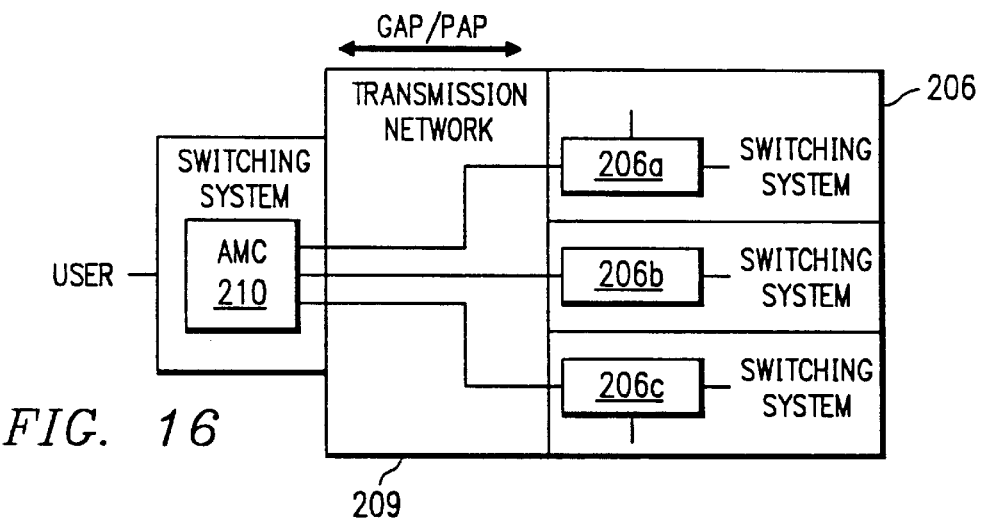
FIG. 16
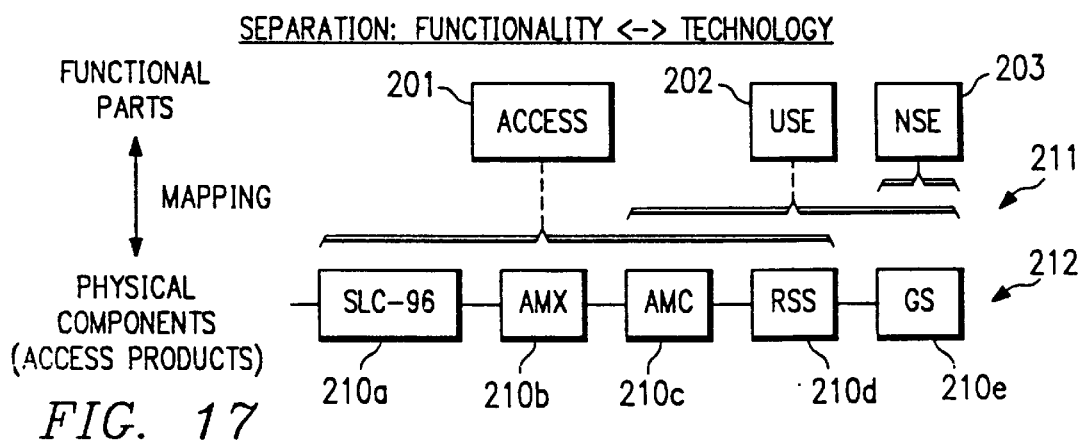
FIG. 17

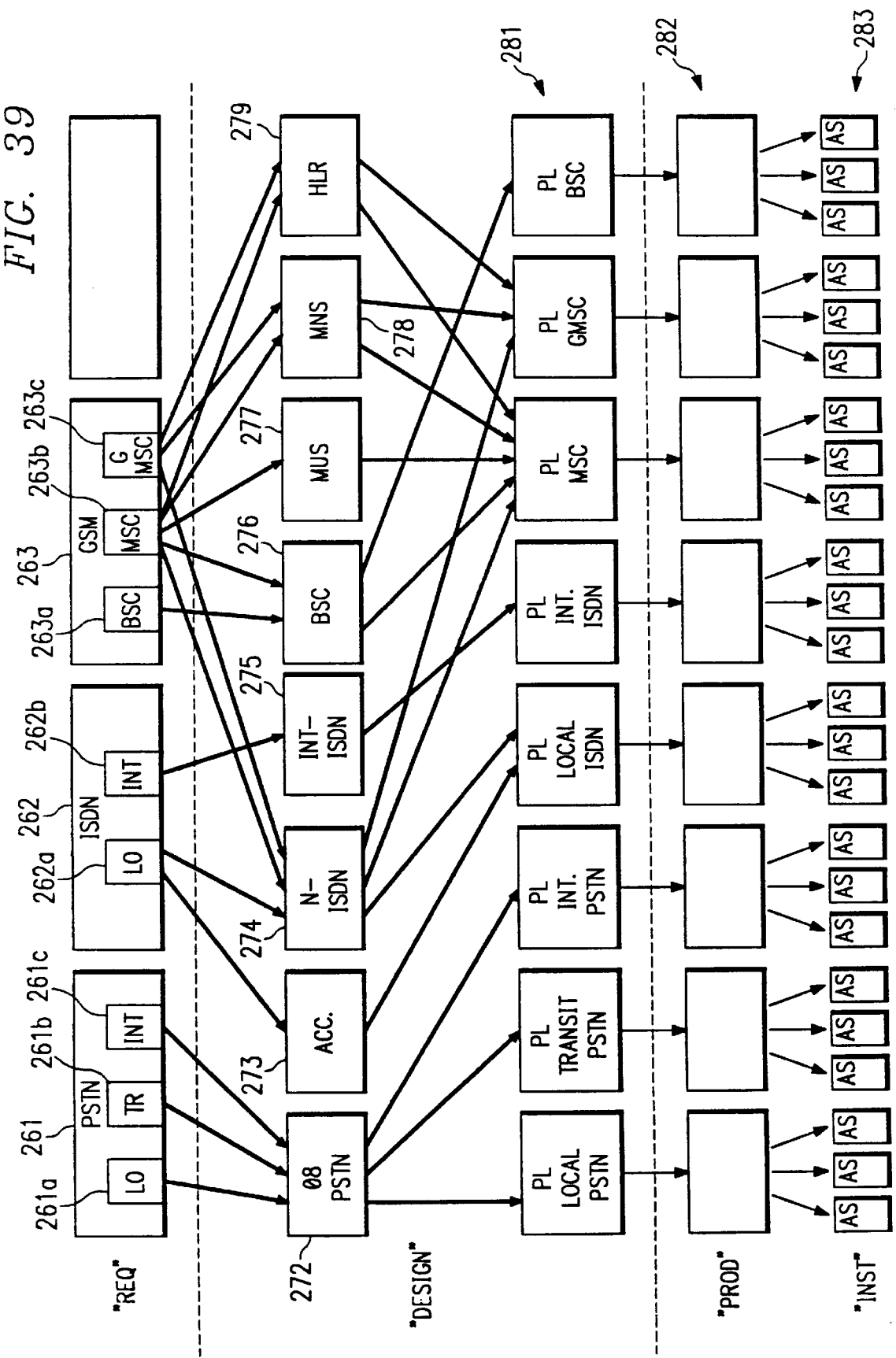

MODULAR APPLICATION SOFTWARE FOR TELECOMMUNICATIONS EXCHANGES FOR PROVIDING ALL END USER SERVICES TRAFFIC HANDLING AND CHARGING REQUIREMENTS OF AN APPLICATIONS TYPE

This application is a continuation of application Ser. No. 08/250,337, filed May 26, 1994, now U.S. Pat. No. 5,691,973 which is a Continuation of application Ser. No. 07/723,166, filed Jun. 28, 1991 now abandoned.

BACKGROUND OF THE INVENTION

1. Field of the Invention

The invention relates to telecommunications exchanges and, more particularly, to a software architecture for use in a stored program controlled telecommunications switching system.

2. History of the Prior Art

In the late 1960s and early 1970s, stored program control (SPC) switching systems were designed primarily around the functions necessary to perform public switched telecommunications network (PSTN) service, that is plain old telephone service (POTS). The SPC telecommunications switches used to render these PSTN services were virtually all designed with a control architecture which separates the parts of the system into functional blocks, each of which perform a separate function in the completion of a call. For example, there are control blocks within a traffic control subsystem of the software which perform digit analysis, route analysis, call supervision, signalling, etc. Each software block performs a certain control function or supervision function within the hardware which contributes to subscriber call setup, supervision, teardown and billing.

Over the years, other special features were added to the POTS services, such as abbreviated dialing, call waiting, and the like, which required the addition of software to the core SPC software operating the switch in order to render these special services.

Stored program control telecommunications switches have evolved over the years into very sophisticated, special purpose, high speed computing machines which include redundant central processors for reliability and remote processors for increased speed and efficiency. A good example of such a switch is the SPC telecommunications switching equipment of the type manufactured by Telefonaktiebolaget L M Ericsson and referred to as the AXE exchange, an earlier version of which is disclosed in the article by Mats Eklund, et al., entitled "AXE 10 System Description," published in *Ericsson Review*, No. 2, 1976, which is hereby incorporated herein by reference. Another example of such an SPC telecommunications switch is disclosed in U.S. Pat. No. 4,322,843 to H. J. Beuscher, et al. Such switches usually include all of the hardware necessary to perform a number of different telecommunications services. For example, they can be used as local PSTN exchanges, long distance trunking exchanges, private automatic branch exchanges (PABX), all primarily by the installation of specific SPC software to configure them for the required special functions.

As telecommunications services became more sophisticated over the years, new applications for telecommunications exchanges came into existence which required additional special functionality in the software controlling the switch. For example, the growth of cellular radio telephone services has required switching exchanges to serve as mobile switching centers (MSC) for controlling the interconnection of various radio base site controllers (ESC) and allowing mobile subscribers to be passed from cell to cell within the radio network. Similarly, the advent of integrated services digital network (ISDN) services has also required special functionality within switching exchanges in order to render these services to subscribers. While a number of separate specialized exchanges rendering different services to their respective subscribers can be connected together into a communication network, it is very expensive, both in terms of redundant hardware as well as operation and maintenance personnel to provide discrete switches separately programmed with the functionality required for each type of telecommunication service to be rendered.

One approach to reducing the expenses of a telecommunication network is to provide a plurality of different functions in the same switch. This involves the adding of additional software blocks within the control modules of the switch to provide the required functionality for the rendition of each service. Such functionality may relate to special PSTN related services, business group or centrex type (PBAX) services, ISDN services, MSC services and others. The problem with such an approach is that while hardware costs are saved by using the same switch for multiple functions, the software, and particularly the interaction of different software blocks with one another, becomes extremely complex. For example, the addition of one new function may adversely affect or even disable the performance of an existing function in a totally unexpected way. As a result, a large part of the software development costs encountered with such systems in use today are connected with trying to anticipate the effect which new code added to the system will have upon the existing code and the testing and debugging of the overall software system in response to the continued addition of new functionality. The evolution of such "megasystems" of software has dramatically increased the costs of adding new upgrades and new functionality to existing services and has increased the development time of such software to the point that new functions are virtually outdated before they can actually be implemented in the switch. These are not desirable results for the telecommunications companies, their customers, or the ultimate subscribers to the services.

Another approach to adding multiple functions to a telecommunications exchange is that of providing multiple processors and dividing out the software to spread it across the several processors. For example, some systems have proposed to have one processor execute certain function blocks of software and another processor execute other function blocks in order to try and decrease the complexity of the software operating within each processor. While multiple processor systems may have some advantages, such as enhanced throughput and call carrying capacity, there are distinct disadvantages with such systems. For example, where there is a chain of functions required for call setup and those functions are spread across multiple processors, a fault in one processor can disrupt the entire call setup process. In addition, the duplication of hardware, such as the use of multiple processors, increases not only the cost of that hardware but also the cost of other ancillary support and maintenance functions. These disadvantages of multiprocessor systems are present whether the several processors are in the same switch and located on a common bus or whether they are located in separate switches and interconnected by means of a local area network (LAN).

Still another prior art attempt to achieve multiple functionality in a single telecommunications exchange is to simply load multiple functionally oriented software systems into the same switch and compile them as one such as, for example, the loading of a PABX software system directly into a local PSTN switch. Such a combination includes at least one large disadvantage by requiring physical line circuits to perform the interworking between the PABX part and the local PSTN part. In addition, there may be other conflicts between the functionality of the two different software systems and certainly no cooperative sharing of separately accessed common resources.

Thus, it would be great advantage to organize the software within an SPC telecommunication exchange in a manner which allows multiple specific telecommunications applications to be performed with optimum functionality within the same switch. Such an architecture is provided by the system of the present invention.

SUMMARY OF THE INVENTION

In one aspect, the system of the invention includes separate software blocks defined to include application oriented functions which are associated together in a single exchange serving different applications. The application modules are served by resource modules which provide the necessary communication between different application modules as well as the necessary hardware interactions to perform their respective telecommunications functions.

In one aspect the invention includes a software system for controlling a stored program controlled telecommunications switching exchange which includes a plurality of telecommunications control modules. Each control module includes software for implementing a group of features configured to provide telecommunications services for a particular application and without regard to configuration of the features for other applications. The system also includes a plurality of telecommunications resource modules, wherein each resource module includes software for implementing common support services which are useful by two or more of the control modules, and communications links between each of the control modules. The links include network protocols for exchanging information without any control module being aware of whether the control module it is communicating with is in the same exchange.

In a further aspect of the invention the resource modules include a transaction manager for enabling communications between respective ones of said control modules and a connection manager for controlling the hardware of the exchange in response to instructions from the control module.

In a still further aspect of the invention each of the control modules include a plurality of user service entities for establishing communications from a telecommunications services user and a plurality of network service entities for establishing communications between a plurality of user service entities.

In a further aspect the present invention includes a software system for controlling a stored program controlled telecommunications exchange in which a plurality of application modules provide telecommunications services to the users connected to the exchange. Each application module include control instructions and data for the implementation of a specific telecommunications application for the users. A plurality of resource modules provide certain functional elements of telecommunications services to each of the application modules. Each resource module has access to and control over the relevant hardware components of the exchange necessary for performing the specific functional actions required to implement its assigned service elements. Data communications is provided between each of the application modules and each other application module and each resource module to enable the telecommunications services of each application module to be provided to the users without use of the control instructions or data of any other application module.

In another aspect, the invention includes a service application module for providing the application specific telecommunications services and an access application module for connecting the users to the service application modules to receive the services.

In still another aspect, the invention includes a method for converting an existing application program for providing telecommunications services within a stored controlled telecommunications exchange into an application module for providing telecommunications services to the users connected to the exchange in which the application module includes control instructions and data for the implementation of a specific telecommunications application for said users. The method includes selecting an existing application program which provides the telecommunications services necessary to implement the application and adding to the application program the protocols necessary to enable the application program to communicate with other application modules for providing other specific communications services to the users connected to the exchange. The method also includes adding to the application program the interfaces necessary to enable the program to communicate with resource modules for providing certain functional elements of telecommunications services to application modules, each resource module having access to and control over the relevant hardware components of the exchange necessary for performing the specific functional actions required to implement its assigned service elements.

In a still further aspect, the invention includes a plurality of network protocols for structuring the passage of messages between respective application modules so that application modules communicate with other application modules without any knowledge of whether or not the module with which it is communicating is within the same exchange.

BRIEF DESCRIPTION OF THE DRAWINGS

For an understanding of the present invention, and for further objects and advantages thereof, reference may now be had to the following description, taken in conjunction with the accompanying drawings in which:

FIG. 1 is an illustrative characterization of a prior art software system within a local telecommunication exchange;

FIG. 2 is an illustrative characterization of the prior art software within a telecommunication exchange which provides for multiple application functionality;

FIG. 3 is an illustrative characterization of the software within a telecommunication exchange having the architecture configured in accordance with the system of the present invention;

FIG. 4 is a graph illustrating the cost of designing functionality into telecommunications software systems;

FIG. 13 is a block diagram illustrating certain aspects of a telecommunications network related to the system of the present invention;

FIG. 14 is a block diagram illustrating a service access module as used in the system of the present invention;

FIG. 15 is a block diagram illustrating certain communications aspects of the system of the present invention;

FIG. 16 is a block diagram illustrating certain aspects of communication between different exchanges related to the system of the present invention;

FIG. 17 is a block diagram illustrating the separation between functionality and technology related to the system of the present invention;

FIG. 39 is a block diagram illustrating software development within the system of the present invention.

DETAILED DESCRIPTION

General Overview

Figure 5:
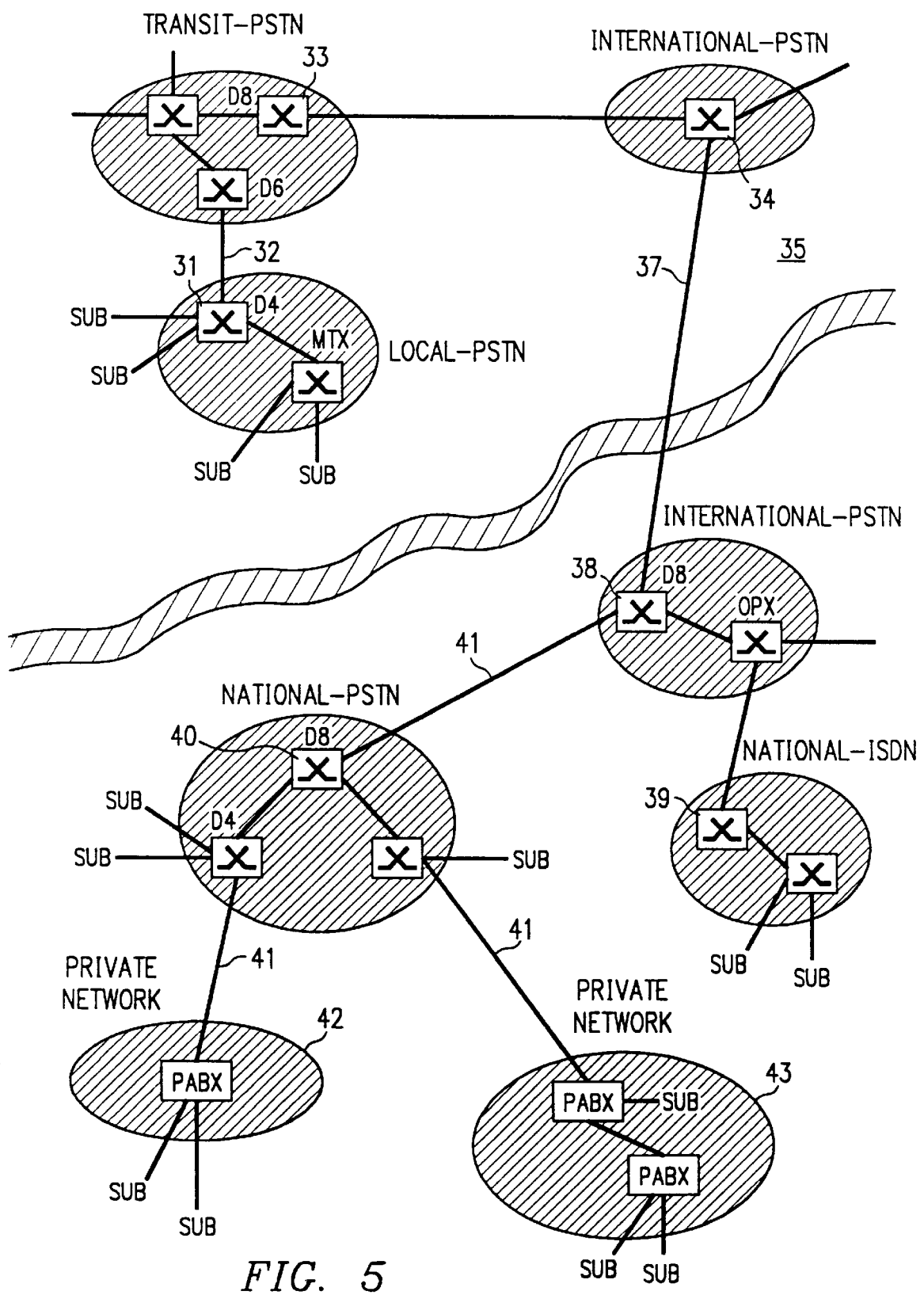
FIG. 5 is an illustrative diagram of multiple dedicated telecommunications exchanges interconnected with one another in a network.

As discussed above, SPC telecommunications exchanges have evolved dramatically over the last several decades. Initially, there was a limited amount of functionality incorporated into each exchange and the software implementing that functionality was directed primarily to the rendition of PSTN local exchange service. Referring to FIG. 1, there is shown a small house 11 as a metaphor characterizing the software subsystem of a PSTN local exchange well known in the prior art. This software has traditionally been organized into function oriented blocks, each designed to perform a specific functional action and to interact with the other blocks to efficiently provide local public switch telecommunication network services to the subscribers connected to that exchange.

As time went on, a number of new telecommunication services were developed. These services, such as integrated services digital network (ISDN) and public land mobile network (PLMN), required substantially different functionality from that incorporated into the software controlling the traditional PSTN exchange. As metaphorically illustrated in FIG. 2, the addition of ISDN functionality 12 and PLMN functionality 13 to the traditional PSTN software functionality 11 required the addition of numerous braces, props and software fixes 14 necessary to provide the new functionality within the existing framework of conventional PSTN based software architectures. The development of such new functionality and the incorporation of it into the existing structural framework involves a tremendous amount of development time and cost, as well as the compromising of numerous features and functions in order to ensure that all of the functionality will work together harmoniously in the same exchange. Moreover, the design of such "megasystems" of software are reaching the point at which the complexity has become so great and the development time so long that this approach is no longer a viable solution to the need for additional telecommunications functions.

The system of the present invention provides a new architectural approach to software structures within existing SPC telecommunication exchange hardware and allows the development of individual application modules for providing functionality for a particular telecommunications application, in a highly efficient functionality. As metaphorically represented in FIG. 3, a PSTN application module 15 may coexist with an ISDN application module 16 and a PLMN application module 17 all within the same hardware and the same application platform 18. The road 19 by which they all communication and interrelate with one another is formed by a plurality of resource modules within the software which enable the respective application modules to communicate with and relate to one another and with respective ones of the resource modules through network protocols. That is, the software within the architecture of the present invention is networked within each exchange in a manner similar to the way in which discrete exchanges are networked with one another, as will be set forth in greater detail below.

Referring to FIG. 4, there is shown a graph illustrating the current cost of development of successive versions of prior art software within a telecommunication exchange. As illustrated, the development costs of one issue of a software package 21 includes a certain initial cost 22 and involve an increasing amount of work as additional functions are added to that software. Ultimately, the cost of adding additional functions becomes so prohibitive that a particular software package reaches its structural breaking point 23 and requires a redesign. Production costs of the next edition of the software 24 involves a certain redesign cost, preferably undertaken at a cost effective time prior to the breaking point of the first software edition 21. As additional functions are added to the next edition of the software 24, it too reaches a breaking point 26 and again requires a redesign into a third edition 27 and so forth. As can be seen from FIG. 4, the amount of work, and thus the costs, of adding additional functions to conventional telecommunications software packages becomes more expensive the more complex the software becomes. Eventually, the software becomes so complex that it is no longer modifiable and requires a full redesign in order to continue to perform its functions. The system of the present invention provides an architecture which dramatically simplifies the inherent necessity of upgrading telecommunications software to add new functionality and dramatically decreases the cost of such continued growth and the expansion of telecommunication services.

FIG. 5 illustrates a traditional telecommunications network in which the objects in the network are the exchanges. A local PSTN exchange 31 serves its local subscribers and is connected via trunks 32 to a transit PSTN exchange 33, which is in turn connected to an international gateway PSTN exchange 34. For purposes of illustration, these exchanges 31–34 are located in a first country 35 and are connected to exchanges within a second country 36 by means of international trunks 37 connected to an international PSTN exchange 38. The additional exchanges served by the international PSTN exchange 38 may include a national ISDN exchange 39 as well as a national PSTN exchange 40, each of which include a plurality of subscribers and are connected by means of trunks 41. In addition, the national PSTN 40 exchange may also be connected by trunk 41 to a plurality of private PABX exchange networks 42 and 43 serving their respective subscribers. As illustrated, exchanges of such an international network are coupled together by means of various networks links and communicate with one another by means of network protocols so that they may serve their respective areas by providing communications between their respective subscribers and other subscribers within the network.

Figure 6:
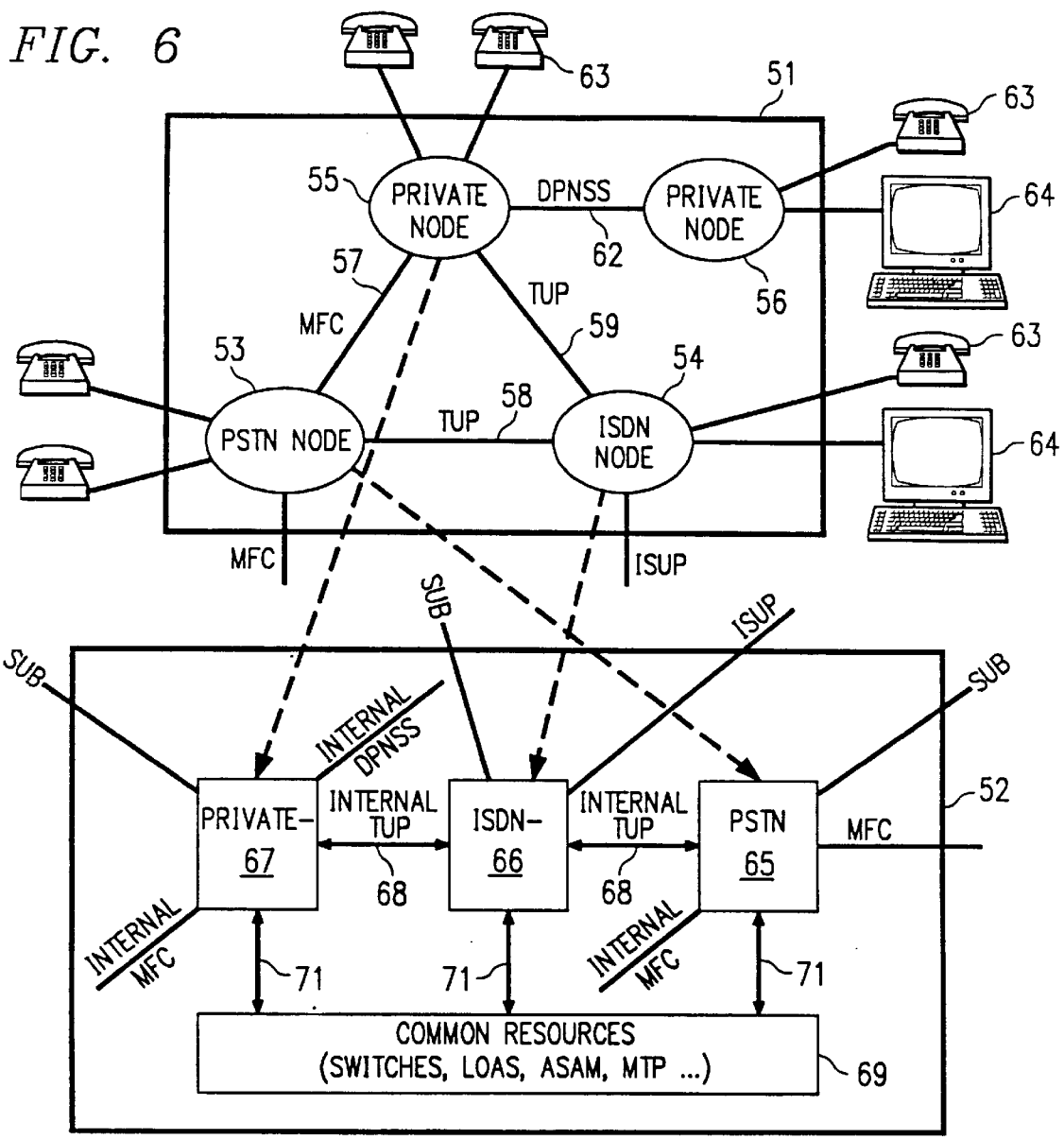
FIG. 6 is an illustrative diagram of the way in which multiple application functionality is incorporated into the software system of the present invention.

Referring next to FIG. 6, there is shown an illustration of the software system of the present invention in which a single exchange 51 can be viewed as incorporating a plurality of separate logical nodes and the functionality of those nodes and the interconnections between them is incorporated into a single exchange 52 containing the software system of the present invention. For example, a local PSTN node 53 may be connected to an ISDN node 54, both of which are coupled to a private business group node 55 which is in turn coupled to another private business group node 56. The local PSTN node 53 communicates with the business group node 55 through a multifrequency code (MFC) protocol 57, while the ISDN node 54 communicates with both the local PSTN node 53 and the private business group node 55 through the CCITT telephone user part (TUP) protocols 58 and 59. The ISDN node 54 may communicate with other ISDN nodes via an integrated services user part (ISUP) protocol 61 and the private node 56 communicates with the private node 55 via a digital private network signalling system protocol (DPNSS) 62. Each of the separate nodes 53–56 include telephone subscribers 63 while the private business group node 56 and the ISDN node 54 may also include data communications subscribers 64. The way in which each of these nodes communicate with other nodes via certain defined protocols is reflected in the software architecture of the present invention which incorporates within a single switch 52 the functionality of the local PSTN node 53 by including a PSTN application module 65. Similarly, the functionality of the ISDN node 54 is incorporated into an ISDN application module 66 while the functionality of the private business group node 55 is incorporated into a business group application module 67, each of which may communicate with one another via a defined TUP protocol 68 and with a plurality of common resources 69 via defined interfaces 71. The common resources 69 may include switches, load supervision (LOAS), announcement machines (ASAM), message transfer parts (MTP) and others. As can be seen in FIG. 6, incorporating the functionality within discrete application modules in the same switch 52 allows great advantages in the simplification of the software into specific application functions. In the system of the present invention, networking within the software is performed in a similar manner inside the switch 52 as outside the exchange.

Figure 7:
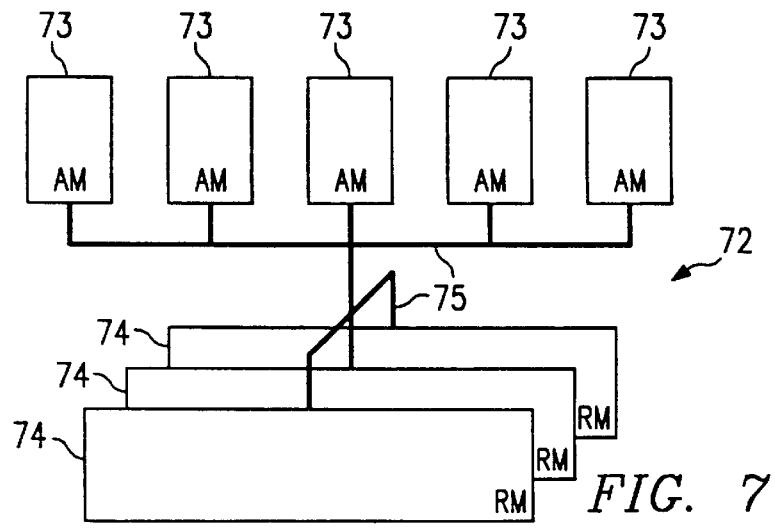
FIG. 7 is a block diagram of the overall concept embodied in the software system of the present invention.

Referring to FIG. 7, there is shown a block diagram of the components of the software system of the present invention 72 which comprises a plurality of individual application modules 73 which are interconnected and coupled both with one another and with a plurality of resource modules 74. The application modules (AMs) 73 communicate with one another and with the resource modules (RMs) by means of defined protocols 75 between AMs 73 and defined interfaces with RMs 74 which, in effect, create virtual switches and enable interaction and networking of the software in a manner which permits the efficient implementation of discrete telecommunication application oriented blocks. This architecture provides great advantages in the implementation of the software by allowing the tailoring of each application module to the individual functionality associated with a particular telecommunications application. For example, the functionality of the software necessary to implement a business group communications application is substantially different to that necessary to implement an ISDN application. Dividing the software into application oriented modules enables the providing of discrete telecommunications functions custom configured for particular applications without the necessity of one application's software interacting with software directed to an entirely different application functionality, as in the case of the present software structures within a single telecommunications exchange. Each of the application modules can readily communicate with one another and may draw upon resource modules within the software which provide all necessary interactions with the switch hardware and with certain functional services which are available to the individual application modules and are common to more than one of the application modules. In effect, each application module comprises a virtual switch or a virtual exchange which thinks that it owns the switch hardware and is free to utilize that hardware exclusively for its own distinct application oriented functionality. This architecture allows the addition of upgrades to the software and enhancement of the functionality of one application module without regard to the affect of those software changes on other application modules. Since the exchange is no longer controlled by a single body of functionally divided blocks, there is much less likelihood that modifying a functional feature for one application will adversely affect the performance of that function in another application.

Figure 8:
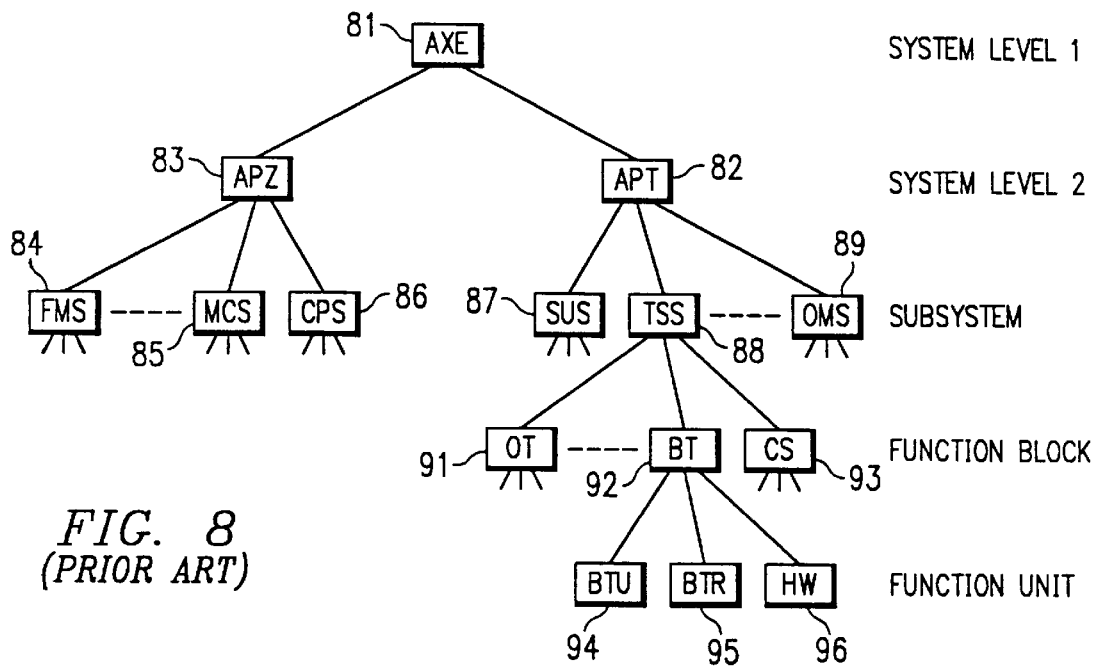
FIG. 8 is a block diagram of the prior art hardware and software units within a telecommunication exchange.

Referring now to FIG. 8, there is shown an illustrative block diagram representing the functional units within which prior art SPC telecommunication switches are divided. On system level 1, there is the telecommunications AXE switch itself 81 which is divided into two principal parts: APT 82, which comprises the telephony portion of the system on level 2; and APZ 83, which comprises the control portion of the system on level 2. Both APT 82 and APZ 83 include hardware in the form of printed circuit board assemblies, and software in the form of programs and data. Both APT 82 and APZ 83 are further subdivided into a plurality of different subsystems on the next, or subsystem, level of the structure. Looking first at the control part 83, there are included a number of different subsystems, some examples of which are the file management subsystem (FMS) 84, the man-machine communications subsystem (MCS) 85 and the central processor subsystem (CPS) 86. Similarly, the subsystem level of the telephony part APT 82 is comprised of a number of different functional units, including a subscriber services subsystem (SUS) 87, a trunk and signalling subsystem (TSS) 88, and an operation and maintenance subsystem (OMS) 89. By way of further illustration, the subsystem units 87–89 are further subdivided on a functional level into a plurality of separate function blocks. For example, the trunk and signalling subsystem (TSS) 88 includes outgoing trunks (OT) 91, both way trunks (BT) 92 and code senders (CS) 93. Finally, on the functional unit level, each of the function blocks are further subdivided into individual functional units. For example, the both way trunk function block 92 is subdivided into a central software unit of the both way trunk (BTU) 94, a regional software unit of the both way trunk block (BTR) 95 and a hardware unit necessary for the implementation of the both way trunk (HW) 96. As can be seen from the illustration of FIG. 8, the telephony portion of the system, the APT 82, begins on the system level 2 and is grouped directly into subsystems 87–89, which are subdivided into function blocks 91–93, which are, in turn, further subdivided into the actual functional units 94–96. Thus, the software in prior art systems is organized primarily in accordance with functional structures which perform separate activities and cooperate with one another for the performance of a telecommunication service.

Figure 9:
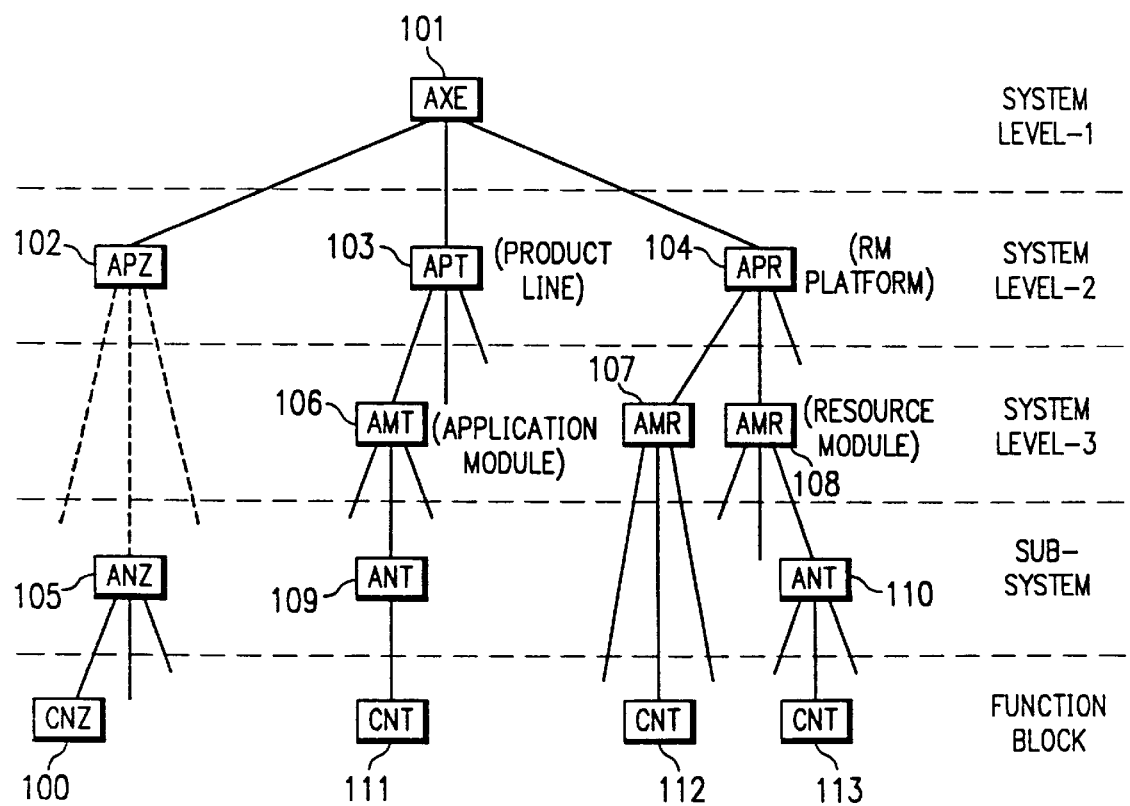
FIG. 9 is a block diagram of the hardware and software units within the system of the present invention.

Referring next to FIG. 9, there is shown a block diagram illustrating the way in which the software architecture of the system of the present invention is structured in contrast to the prior art structure of FIG. 8. In FIG. 9, system level 1 still includes the telecommunications AXE switch itself 101 which is subdivided into a control part (APZ) 102, a product line oriented telephony part (APT) 103, and a resource module platform part (APR) 104, each of which reside on system level 2. In the system of the present invention shown in FIG. 9, there is inserted into the system organizational structure a new level 3 between system level 2 and the subsystem level. On system level 3, there are no changes in the control part (APZ) 102 and its next subdivision is found directly on the subsystem level (ANZ) 105. However, on system level 3, the product line or application oriented telephony part APT 103 is subdivided into a plurality of different application modules 106 within each of which is contained the necessary software for implementation of a particular telephony application. Similarly, the resource module platform (APR) 104 on system level 2 is subdivided on system level 3 into a plurality of resource modules (AMR) 107 and 108. These representative resource modules 107 and 108 contain the necessary software for implementation of certain functions which are common to more than one application module 106, and therefore may be shared between those application modules, as well as functions necessary for communication between respective ones of the application modules 106, between the application modules 106 and resource modules 107 and 108 and the functions necessary to cause the switch hardware to perform the telecommunications functions. From system level 3, both the application modules 106 and resource modules 107 and 108 are then subdivided at the subsystem (ANT) 109 and 110, respectively, which are in turn subdivided on a function block level (CNT) 111, 112 and 113. The function blocks 111–113 are, of course, further subdivided into functional units as has previously been the case.

As illustrated in FIG. 9, the software architecture of the present invention adds both a new system level 3 to the structure of the software, containing the application modules 106 and resource modules 107–108, as well as the resource module platform 104 and its subparts contained on system level 3 and below. This reorganization of the system structure provides greatly enhanced manageability of the software. For example, the system organization of FIG. 9 provides application modules and resource modules which are of lower individual complexity, can be designed independently and in parallel without the need for coordination between the design of other application modules and are of a size that is easily understandable by the individuals involved in the process. This reduction in both complexity and the necessity for design coordination with others areas results in a decrease in the design lead time as well as the cost of design projects.

Having given a general overview of the application modularity concepts and their overall structure, we will now address and develop the basic principles used in a practical application of these concepts to telecommunications exchange architectures.

A basic concept of the application modularity architecture is that of defining the functionality to be incorporated into each application module at a relatively high level. Such definitions involve four aspects: a functional specification, a network specification, a system specification and a general implementation. To illustrate the procedures which would be applied to the functionality design of each of the specific application modules to be incorporated into the architecture of the present invention, business group voice services, e.g., Centrex services, will be used to exemplify the design and specification of a particular telecommunication service for incorporation into one or more application modules, including, for example, an access application module and a business group application module.

Application Module Functional Specification

Since the system of the present invention is based upon application modularity, the particular telecommunications applications, such as business communication services, can be designed without taking the needs of other telecommunications applications into account. Such a design includes a top-down methodology based upon the levels of service, network, system and implementation.

Business group services are paid for by subscribers, that is, the businesses which lease or purchase their equipment rather than by users paying for the service on a per call basis. It is therefore necessary to consider the types of subscribers that may need a business telecommunications system and why they have such a need. It is also necessary to consider the types of subscribers which need to be supported in a business group and how calls can be routed to each of them within the system.

Subscriber Types and Their Users

In normal, medium to large subscribers, most traffic is internal between the subscriber's employees. The main purpose of the telecommunications system is to enable employees of the business to communicate with each other as required for the efficient performance of their jobs. While there will also be some communication between employees in the outside world, it may be possible to make some or all of these calls by direct dialing. In addition, there will be one or more operators to assist users and outside callers in making efficient use of the facilities which are available.

The user types within a business communications group generally include an operator. It must be possible to easily reach an operator, either from outside or inside the business group, and the operator must have a comprehensive and flexible set of services available. Since the operator may be expected to assist any user within the business group, an operator needs to be able to do anything that any other user could do themselves. In addition, operators have considerable traffic to handle so that call handling productivity is important. Since operators specialize in handling calls, they will be likely to learn the options available to them and the incorporation of special functions for an operator to quickly set up connections are therefore likely to be cost effective when included within business group services. The operator should also be able to expect a very high priority in the delivery of telecommunications services if there were competition within the group for access to other users. In addition, if more than one operator is present, an operator call should be able to be answered by any one of the operators, since it is the service, not the individual operator that is sought by a user. Due to the importance of any calls placed to an operator being completed, such calls should be held in queue until an operator is free instead of having a busy tone returned to the caller if all the operators are busy. It is also desirable that several queues be included with different priorities, and an operator should be aware that there are calls waiting in queues even when occupied on another call. Further, arrangements should be made within the system for operator calls to be handled even after the operators have gone home, in the form of night service of a similar type to that rendered by the operators during working hours.

A second type of user within business group communication services, is the ordinary employee and callers, from both inside and outside of the business group, should be able to contact such employees at their place of work. Therefore, the dialed number should identify the employee rather than a physical location, and when the employee moves, either permanently or temporarily, calls directed to that employee should follow along to the new location. An employee is also likely to have a need to contact fellow workers as well as a need to make external calls. For this reason, restrictions on external calls may be imposed by the business group subscriber since charges would be incurred for such calls.

The manager/executive user within the business group telecommunications system should have all the facilities available to an ordinary employee as well as additional services, including speaker phone services, since such an employee is likely to have an individual office. In addition, a manager should be able to expect priority access to services, including priority access to certain individual users. A manager will also have secretarial assistance available who should be able to filter calls, due to nonavailability or call preference, as well as to establish calls for the manager in a manner similar to that of an operator.

Another type of employee user requiring special treatment is the secretary, who may provide a service to one or more managers. All secretaries must have all options available to the managers as well as direct intercom between the secretary and the managers to which the secretary is responsible.

In addition to the classes of employees discussed above, there will be other users of a business communication group of a functional type which require special accommodation within the functionality of a business group application module. For example, a call has traditionally been made to an extension at a fixed location, and while business uses directed to employees rather than locations are tending to replace this, such an application will still be needed for certain purposes. For example, this may be the case when several employees share a telephone or a room, or in a conference room which has a telephone but no employee permanently located there. In addition, emergency answer points should be provided for and since calls to such points should always get through and be answered, outgoing calls from such points are prohibited. Similarly, incoming calls made to such an emergency answer point should be automatically conferenced, even though the user is already engaged, since it is likely that there may be several callers wishing to report the same major incident. In addition, service support point help lines, which are accessed to obtain information or advice concerning a nontelephony service, should be provided for in the functionality of a business group. Since there is likely to be fairly heavy traffic to such a user, the probability of getting through should be kept high along with a provision for the queuing of calls. The queue should be served by more than one user since it is a service rather than an individual which is sought. Service support point users are unlikely to require any particularly sophisticated service or support for outgoing calls, although such calls may be permitted.

There also may be times when it is important to contact a specific employee who is not at his/her normal place of work, and three different user types facilitating such contact may be provided for including paging, cordless and roaming user services. If a caller encounters busy or no reply when seeking to contact a paged mobile service user, paging can be initiated by dialing a short code and the paging receiver number. The user carrying the paging device will hear a tone and should then be able to use any normal extension to dial a short code and the paging number. The call would then be automatically connected to the original caller. A cordless mobile user has a cordless connection to the network with a radio connection to a single transmitter, the signal of which can be received over a limited distance, such as a few hundred yards which should suit most operational sites. A roaming mobile user makes use of a cellular radio telecommunications network and connection can be made from the business group to such a user located anywhere within the network.

Because there is a growing interest in making it possible for employees to be able to work at home, allowances for a home telecommunications user should make it easy for communications to follow workers to their homes without affecting the services and facilities available within the business communications group.

When a hotline user goes off hook, a connection is automatically made to a predefined called party. One optional modification in such a service is that of providing a pause between the off-hook condition and making the connection to allow the user to change the type of service wanted by dialing or keying appropriate digits. Such hotline service should be a facility available to a variety of users rather than to a separate user type itself.

Most of the communications users exemplified above are found in larger businesses. In the case of small subscribers, it may be that there are too few users to justify a dedicated operator and with fewer internal extensions, a higher proportion of the traffic is likely to be internal. The user types expected with a small subscriber may include a basic key set and an executive key set. In the case of the former, when calls from outside the business group arrive, each user will receive an indication and each user may accept and, if required, forward the call to another individual. In addition, with few internal users, each basic key set may be called by using an individual key. The executive key set will include the same basic call setup but with extended displays, functionality, etc.

In the case of hotel, motel and hospital types of business group communication users, each of such subscribers may have guests who wish to make calls from the business group to the outside. Provisions should be made that such guests would be expected to pay for those calls. Therefore, user types would likely include the same as those in large businesses, but in addition, would include a house phone service, which would be directly connected to the public switch telecommunication network (PSTN) and should be available to guests and need not form part of the business group itself. A guest's phone should be available to make it possible for them to make external calls easily with charges for those calls being recorded for addition to the visitor's bill. It should be possible to change the class of service if the room within which the phone is located is not occupied by a guest.

In the case of dispatched transportation services such as radio taxis and the like, such a category of subscribers is dependent upon incoming telephone calls for its business survival. Therefore, any lost calls means loss of business credibility and service should include simple, automatic call distribution (ACD) answer point service. In such service, incoming calls will be queued and it should be possible for more than one user to pick up calls waiting in the queue. All users will have an indication of the state of the queue and the number of calls remaining to be answered.

In the case of mail order businesses, credit card services and the like, such subscribers are also dependent upon incoming telephone calls for their very business existence. However, in this case, the number of users available to handle the calls will be higher and the handling of calls is likely to be more complex. Thus, any of the user types discussed above in connection with large businesses may be included.

In the case of automatic call distribution services, such as airline reservation systems, there are a number of individual user types within such service including an agent, a supervisor, and a manager. In the case of ACD agents, calls will be queued and may be either offered to or forced upon agents who should be given the opportunity to temporarily block out queue access while performing other duties. Agents may also have an indication of the incoming call origin and trunk number, the length of the queue, and the status of held and transferred calls. Simple access to the supervisor and the possibility of having calls recorded is also required, and this should be possible either with or without the knowledge of the calling party. Supervisors may be required for assistance or for abusive/threatening calls. Thus, the ACD supervisor should have all of the same facilities as the agent but with the additional capability of being able to monitor the status of agents, including historic call handling performance. The supervisor may also intrude upon agents' calls with or without the agents being aware of it and direct calls to specific agents. The ACD manager should have all of the supervisor's facilities but should also have a real time and historic information system and the opportunity to reconfigure/reconnect queues and alter other ACD system parameters on line.

Call Routing in Business Groups

When a call is established within business group application modules, the system will be informed of the desired call destination by means of a string of digits referred to as the directory number (DN) normally identifying the desired user. In order to meet the needs of business group subscribers directory numbers need to support the following requirements. First, directory numbers should include moveability and network transparency so that business group users should be able to be reached by use of the same directory number even if they change their physical location. Whether the business group is implemented by one system or by a network should be transparent to the user and in either case, services should be the same for all combinations of users in the business group. Second, the directory number should include multitenant configuration with one system being used to support one subscriber. Such would be the normal system where a public telecommunications administration in providing the service, but is somewhat less common where the service is provided by a private automatic branch exchange (PABX) within a private network. One subscriber should not be aware of any of the others even though they could be sharing one or more operators. Finally, directory numbers should meet the requirements of groups in the event the caller does not need to contact a particular individual but any one of a number of individuals within a group. Those individuals would need to be registered as members of the group, for example, any member of a department might be able to supply the desired information to a caller. Group membership should be under subscriber control and calls to the group should be routed to any free member of the group. The group membership and arrangement should enable the condition that either all members are equally likely to get calls, i.e., a distribution group, or the members of the group may always be tried in a specified order, i.e., a hunt group.

With regard to the directory number/user equipment relationship, the number of user types encountered, as discussed above, demonstrates that the use of a directory is becoming increasingly more varied. One user may be covered by more than one user type and hence, calls to more than one directory number may be routed to the same item of user equipment. However, when the directory number defines a group, as discussed above, the directory number/user relationship is not as simple, and such examples are increasing within business communication groups. The subscriber should be able to define the numbering plan to be used within the business group. With regard to external access, a constraint occurs when calls cross gateways between the business group and other networks in that the number plan used across the gateway clearly needs to be consistent with that which the other network expects. However, the business group may translate the numbers used across gateways in order to enable users to obtain the service they desire without unnecessary complication or confusion. The allocation of internal directory numbers is under subscriber control and the number plan must allow for the invocation of services and facilities by dialing/keying digits without ambiguity.

The system should include facilities for multiple levels of communication from the network to the user including ringing of a bell and beeping of a paging device. In addition, once a speech connection is established, a user should be given an audible indication of the network state, either through selected tones or recorded announcements. While lamps may be used to give a limited number of state indications, LCD displays and video terminal displays may be employed to give a much greater quantity of information. Similarly, communication from the user to the network should be provided by on-hook/off-hook indication, the dialing/keying of digits, both for immediate and delayed transmission, and recall/flashing of the receiver. In addition, facilities keys can be used to invoke certain common facilities along with keyboard inputs at a video display unit and voice recognition techniques.

Business Group Service Descriptions

The types of services available within a business group had been defined by numerous national and international telecommunications and standards groups, particularly with reference to PABX services. In addition, the variety and scope of communications services demanded by business group subscribers is increasing at a very rapid rate.

The basic business group service package, i.e., the minimum communications services considered necessary for an automatic service, includes services to both extension users and operators. Extension users should be able to make calls without operator assistance, including calls from one extension to other extensions, to the PSTN and over tielines. Extension user operator assisted services should include operators being able to handle calls to or from the public network, calls outgoing or incoming over tielines, or calls diverted to the operator due to failure, and ensure that those calls are each successfully handled. Services to operators themselves should enable the operator to place an incoming call on hold before that call has been transferred to a waiting party. The operator should have an indication that the call on hold, either permanently or after a predetermined time period. It should also be possible for the operator to put a caller wanting a busy extension on hold, which call should be automatically diverted back to the operator if not answered within a predetermined time. The operator should have monitoring features available, including the identity of the external line calling or being called by the operator, the identity of an extension calling or being called by the operator, and for calls diverted or redirected to the operator, the identify of the called extension and the calling external line and the reasons for diversion. The operator should also have available a display of call states, including: call waiting for an answer, extension being rung, extension engaged and extension answered.

Operator services should further include an intrusion feature so that when an important call is received for an extension which is already busy, the operator should be able to intrude upon the existing conversation and offer the new call to the engaged extension. Such an intrusion should be accompanied by a tone heard by all three parties concerned. In addition, there should be an executive intrusion service allowing executive users similar intrusion features.

Business group services should allow for rapid call setup, including various ways of reducing the number of digits to be dialed in order to establish some of the more probable calls within the system. One such arrangement includes a procedure in which the subscriber establishes a common list of telephone numbers which are frequently called by the users and each such number is given a corresponding abbreviated number. When a short code, including the abbreviated number, is dialed, it is converted by the system into the called telephone number. The call thereafter proceeds as a normal call. The subscriber may arrange this service in such a way that a part of the list may only be used by certain groups of users. Another implementation is that of allowing a particular extension number who frequently needs to call certain telephone numbers to be given or to be able to prepare its own list of corresponding abbreviated numbers. The stored numbers may be internal or external and when a short code, which includes the abbreviated number, is dialed, it is converted by the system into a called telephone number which is then processed as a normal call.

Rapid call setup services within a business group application module should also include the possibility for a user executing a short control procedure to repeat the dialing of a number previously dialed from the same extension. One implementation of such a redialing service is based upon the automatic registration of every complete dialed number within the system and the possibility of its redial by the use of a short code.

Another abbreviated dialing service arrangement is that of a particular extension number setting up a call to a predetermined telephone number by merely lifting the handset. Such services may be either fixed so that such connection is implemented in all cases where the user goes off-hook, or the allowance of users to set their own fixed destinations by providing a time out after which the fixed destination call would be made. The time out gives the user the opportunity to cancel the fixed destination request within the system before it is actually made.

Another class of service features within a business group includes restriction and priority services which gives the subscriber control over some of the call types which are available to individual users within the group. Two such service restrictions are control over certain categories of outgoing calls from particular extensions as well as certain categories of incoming calls to particular extensions. Priority may also be given to certain nominated users regarding access to the business group operator so that when the operators are busy, the subscriber may decide which users have priority access. Such operator priority may be either automatic for all designated users or it may be necessary for users with the appropriate class of service to invoke priority by the use of appropriate codes. Another related business group service is diversion bypass which enables operators and designated users to bypass call diversion and present urgent calls to extensions which have invoked call diversion. Such service may be invoked either when the initial call attempt is made or when the caller discovers that the called extension has been answered at the diverted to extension. In addition, it should be possible for an extension user to delete or prevent either generally or selectively, diversions to his extension within the group.

The handling of calls to extensions at which the user is not present may be handled in a number of different ways within a business group application module. First, such calls may be immediately diverted under the control of any user having the appropriate class of service to divert the call to another directory number which may either be represented by another extension or by a recorded announcement machine with or without the possibility to record a message. The user invoking the call diversion feature may also register a further diversion from the nominated extension in a "follow me" diversion or to cancel the diversion from the nominated extension.

Another option would be that of a diversion upon ringing but no reply and such service should be under the control of the user with the appropriate class of service. Under such diversion, the user can divert to another directory number which can either represent another extension or a recorded announcement machine, with or without the possibility to record a message. Such diversion should also be capable of being further diverted from the nominated extension by a "follow me" diversion and the user should also be able to cancel the diversion from any nominated extension. Another absent extension service is that a user with the appropriate class of service finding that a call attempt is not answered, may register a call back request. When the called party next becomes free after completing a service request, a new attempt to establish the original call will be made.

An additional business group service is that of giving extension users and operators the possibility of paging called individuals who are not present at their extensions with the paged person being able to answer from any extension. In addition, a call should be able to be either parked or held at one extension and then later retrieved from the same or from a different extension. Similarly, a call ringing at one extension should be able to be picked up by a user at a different extension by dialing a short code.

Another type of service within a business group application module relates to busy extension services and increases the likelihood of a call encountering a busy extension being successfully handled. One way of handling such calls is having the call be completed automatically when the called line becomes free without having to redial the extension number. A call back when free request may be registered by a calling party who has encountered a busy condition, and when the called party becomes free, the following sequence will be initiated:

(a) the called party's line will be blocked;

(b) the calling party will be rung back; and (c) when the calling party answers, the called party will be rerung, using a distinctive tone.

In addition, call diversion from a busy extension may also be implemented along with the possibility for a user, engaged in an existing call, to be given an indication that someone is attempting to obtain a connection to his number. A called party receiving a call waiting tone might either ignore it and continue in the existing call or implement certain procedures, such as a switch-hook-flash, to be connected to the intruding caller, followed by another switch-hook-flash to be returned to the original party.

The system may also give an executive user at a selected business group extension to, when calling another extension which is already engaged, intrude into the established conversation. Such service may be invoked either with or without prior validation and be available on a class of service basis which determines which parties can intrude on which others.

Various possible call charging services should be provided by the business group application module enabling the metering of calls from individual extensions for both charging as well as statistical data purposes. The data from such call metering may be provided as printed records or statistical information within the system.

Another family of services within the business group application module would include multiparty and group services, comprising three-party service within the business group. Such services enable a user to hold an existing call and make a call to a third party, including the ability to switch between the two calls, the introduction of a common speech path between the three parties, and the connecting of two other parties together and leaving the conversation. Such services may also control which parties can be placed on hold. Conference calls and add on conferences may also be provided within a particular business group.

Another family of services which should be provided within the business group relate to group hunting and includes the provision for automatic selection of a free extension from a group of extensions when a call is placed to a group number. One version of such a service includes beginning the search for a free group member always starting with the same number and proceeding in the same order. Another possibility is beginning the search with a different number each time, which tends to produce a more random distribution of calls. A related service provides for a dial answer of group calls within the business group in which calls to a group number are queued. While any calls are present in the queue, an audible and/or visual signal will be given and any group member can pick up the call which has been waiting longest by means of a simple code. This technique provides a simple automatic call distribution service within the group.

The foregoing definition of potential services within a business group application module may include other services. However, the examples given above indicate the type of functionality which should be defined when specifying the overall operation within a business group application module. Similar functionality would be defined for the particular telecommunications applications to be furnished by each application module of the present system. Each function and service may be optimized for its particular application. Once the services within any particular application module of the present system are defined, it then remains to define which users would have which services. Once such service/user association decisions are made, the basic functionality issues related to service in the application module are completed and it remains to decide which application modules are needed in order to support the desired functionality and to specify the network level portion.

Application Module Network Specification

General Principles

When specifying the upper or service level of any application module, such as that of a business communication group, the services are described as they are seen from outside the system. The network level is, however, directed to the services as they are seen within the application module itself. Two basic principals which should be observed are:

1. A service should appear identical to the user regardless of whether the other users involved in the service are on the same or other nodes in the network; and
2. The user must be able to move from one node to another without the necessity of changing the user's number.

On the network level, the services to be provided are considered in terms of the demands they place on the network. Moreover, the network level is concerned with the allocation of functionality within the network and such issues as centralized or distributed control within the network.

In general, the first step is to consider how a telecommunications application is specified, which may include specification as a development of an already specified service network, e.g., PSTN, or as a separate service network, e.g., ISDN, as specified by C.C.I.T.T. The second step is to identify a reference model for the service network, i.e., nodes with specified reference points in between, e.g., access and transit nodes with specified protocols as reference points. This reference model for a service network will form the base for structuring of the system into AMs. In reference models for the nodes, common functionality is identified and will form the basis for structuring the system into RMs.

The Network Model

In general, a network can be seen as a number of nodes connected together by links. In a telecommunications network, the nodes are telephone exchanges, subscribers and other peripheral equipment, such as computer databases. Traditionally, the controlling nodes in a network have been designed to fulfill specific roles, such as local exchanges, transit exchanges, mobile subscriber exchanges and the like. However, more and more exchange nodes are being asked to fulfill more than one role at the same time. This has often caused problems in design due to the interaction of the different requirements for each role. This is especially true with centrex business group communication functions where there is a need to see a centrex group as a separate PABX, which is isolated from the public switching functions of the system.

There are telecommunications administrations that specify business communications services as a separate service network. The reference model for business communications consists of access nodes and service nodes. These form the basis for identification of the business group AM, the analog access AM, and the digital access AM.

If we consider the nodes we wish to implement in a network as logical elements rather than physical elements, it can provide a more flexible solution to the problems. Each logical element can be seen as a component in an application of which the business group application module is merely one example. Other examples include the PSTN node, MSC node, etc., and each application supports a number of already defined interfaces, such as MFC, C7, DASS1, DPNSS, R2, etc., each of which can be used to interconnect different application modules, both internally and externally within the physical exchange. Such a logical node oriented structure allows the definition and development of application modules separately from one another by using defined interfaces.

It has been suggested that basic telecommunications features should be able to be used in any application; however, each application has its own distinctive nuances and requirements for each basic feature because of the nature of the communication services to be provided. For example, the call diversion feature has different specific requirements when implemented for PSTN services, business group services, mobile services, and ISDN services. Thus, if there was only one call diversion feature within the system, it would be affected by the addition of each new application to the system.

In accordance with the system of the present invention, each application can be designed in the most suitable way with basic features adapted to that particular application. Each application would be a functionally modular unit that can be freely combined in one exchange with any number of other applications. In the network model, an instance of an application module is called a logical node. The logical nodes are all linked together to form a logical network.

The network model provides the opportunity to functionally decompose the telecommunication applications for complex services into several simple application modules. Each module can be designed apart from the others and there is no need to be concerned about the interactions with other modules or the internal workings of the other modules. Once objects have been implemented in accordance with such networking principles, all services will function identically regardless of whether subscribers involved are located in the same or in separate nodes and network transparency of services will have been achieved.

In applying these principles to the business group services, as an exemplary application module, a subscriber does not want to be concerned with implementation problems. Implementing networks by means of exchanges connected together via links rather than by one single exchange should not be allowed to degrade the service provided. When a call is to be established, the system will be informed of the desired destination of the calls by means of a string of digits referred to as a directory number. A directory number should identify the desired user, not be associated with a special item of user equipment. The subscriber defines the numbering plan to be used within the business group and the allocation of internal directory numbers is entirely under the subscriber's control. However, for calls outside the business group, the directory number must conform to external convention and/or standards and the number plan must also allow for the invocation of services and facilities solely by dialing/keying digits without ambiguity.

In the case of groups and queues, the caller does not need to contact a particular individual but any one of a number of users. Since calls to the group will be routed to any free member of the group, it must therefore be possible for groups to include users connected to different exchanges. In the case of queues, if all members of the group are busy and the call waits at the queue until a user becomes free to accept the call, again, it must be possible to distribute the members of the group around the network. Within a private network, a subscriber will expect to be able to mix different manufacturer's equipment and, in practice, the subscriber is likely to have PABXs in service already; therefore, the business group application modules will have to be able to interwork with that existing equipment.

Business group users must also be able to make calls to, or to receive calls from, users outside the private network. Such calls are likely to be charged on a per call basis and the gateway chosen should be such as to minimize call charges. The business group application module of a public exchange can be expected to be supporting users belonging to many separate groups. Operators may be shared by more than one business group; however, calls between members of different groups must go through a gateway and should not be allowed to interact directly.

The telecommunications services to be provided by a business group application module have been discussed above and the principal definitions for those services come from standards documents. Each and every service incorporated into an application module must behave in the same way regardless of whether the parties involved are located on the same or on different physical nodes in the same network. Therefore, when the network transparency of services is considered, the particular user type invoking the service will, in many cases, need to be considered.

The generic system level architecture for each application module in an exchange, arranged in accordance with the system of the present invention, including the exemplary business group being discussed herein, employs the shared use of resource modules. The access application modules own the line access hardware along with some software associated with the interface. They have no knowledge or understanding of any of the services supported. The resource modules supply general support facilities for all the application modules in the exchange. The transaction manager resource module provides common facilities to all application modules to assist in the transport of messages. It establishes links between software components in different application modules. The connection resource module owns the switching hardware and other pooled resources such as tone receivers, multijunctures and the like, which enables the application modules to use those resources and resolves any conflicts and demands for the same connection or resource. Other resource modules, such as charging support, operation and maintenance support, analysis support, time supervision support, and the like, will also be employed in assistance of the application modules. The resource modules in the present system can be seen as a set of tools wherein each application module selects and uses what is needed from the tool box for its specific telecommunication application. The resource modules are accessed through their interfaces which are strictly backwards compatible. The resource modules provide a platform to support the design of telecommunications applications, i.e., the application modules. The different components of both the application modules and resource modules are implemented in software blocks.

Network Communications

Since the provision of a telecommunications service necessarily involves more than one object, it is necessary to consider how the different objects communicate with one another. Such communication is accomplished by means of protocols.

There are basically three types of communication protocols within the architecture:

1. Intra-network communication protocols;
2. Internal protocols;
3. Inter-network communication protocols.

The intra-network protocols involve communication between intelligent objects forming part of the same network. Protocol use is needed to support all the services provided by its network type. The information to be carried between application modules includes all of the information that has to be carried between separate nodes of the same network type. Therefore, the protocol used between application modules is a superset of the protocol defined for use between nodes, for example, the lower levels will follow the Q900 series recommendations. Since there is currently no agreed international standards for the networking of business group services as standard, such as the open U.K. DPNSS standard of information, flow can be used in such instances.

The purpose of the internal protocols is to communicate between all which objects required in order to support the telephony services. Such protocols should be capable of conveying:

1. information elements of only internal significance, e.g., connection reference point;
2. information elements needed to support a basic telephony service; and
3. envelopes for information elements of significance only to particularly sophisticated signalling systems.

The inter-network communication network protocol comprises standard digital protocols used in telecommunication systems. Those such as telephone user part (TUP), integrated services user part (ISUP), national user part (NUP), etc. can be employed as they are currently used between nodes of a telecommunication network today comprising separate switches. A gateway service module is used for each type of application module and communicates with the application network for the other network types via transaction support.

Software Module Communications

Figure 11:
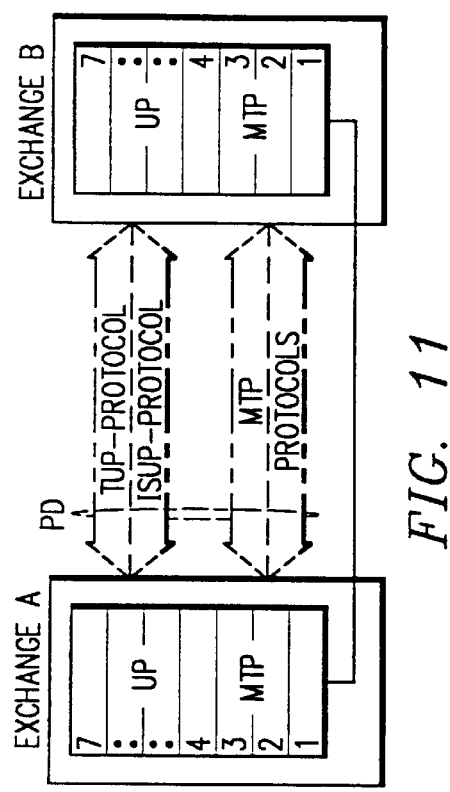
FIGS. 10 and 11 are block diagrams illustrating communication between two exchanges by means of network protocol signalling.
Figure 10:
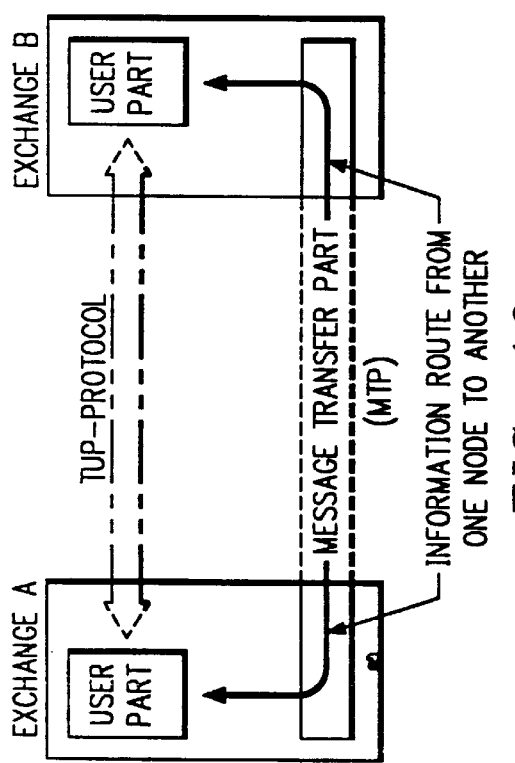

An important aspect of the system of the present invention is the provision of effective communications between the various software modules. The communications between application modules is network oriented while the communications between application modules and resource modules is system oriented. The network oriented communications is in the form of protocols which are specific and well defined rules for controlling information transfer between systems, such as telephone exchanges. Protocols are made up of sequences of messages with specific formats and meanings, e. g., TUP, MFCR2, TCAP, etc. FIGS. 10 and 11 illustrate communications between a pair of exchanges according to the CCITT signal system no. 7 telephony user part (TUP) signaling protocol. FIG. 11 shows that the message transfer part (MTP) corresponds to approximately layers 1–3 and that the user part (UP) represents the remaining layers 4–7. Examples of user parts include telephony user part (TUP), integrated services digital network user part (ISDN UP), etc. A protocol that can communicate with other exchanges is documented in the form of a protocol description (PD) which describes all layers 1–7, e.g., which MTP (e.g., as exemplified in the yellow and red books of the C.C.I.T.T.), the format of messages in the user part, coding of information fields, procedures, etc.

As discussed above, numerous ones of the existing network protocols may provide communications between application modules in accordance with the system of the present invention. Set forth below is a list containing illustrative representative protocols which may be employed in particular embodiments of the present system along with a reference to the C.C.I.T.T. documentation thereof which is hereby incorporated by reference herein.

| PROTOCOL | C. C. I. T. T. RECOMMENDATION NO. |
|---|---|
| MFC-R2 | Q. 310–Q. 490 |
| TUP | Q. 72X |
| ISUP | Q. 76X |

| PROTOCOL | C. C. I. T. T. RECOMMENDATION NO. |
|---|---|
| D-CHANNEL | Q. 93X (LAYER 2: Q. 92X) |
| TCAP + SCCP | Q. 771–Q. 795 |
| CCITT NO. 7 | Q. 700–Q. 716 |
| CCITT NO. 6 | Q. 251–Q. 300 |

Figure 12:
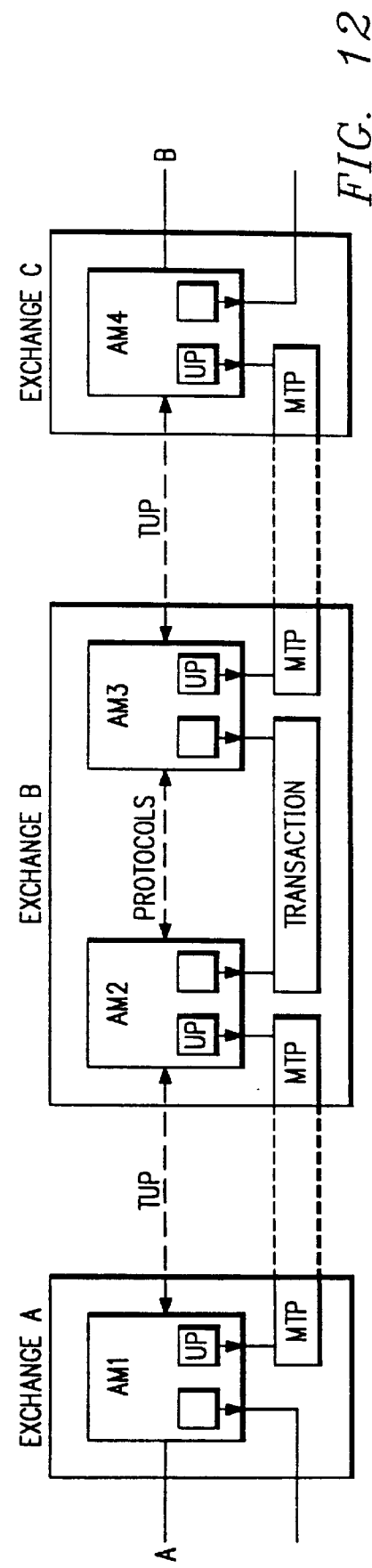
FIG. 12 is a block diagram illustrating communications between application modules through internal network protocols in accordance with the system of the present invention.

To illustrate how signalling is performed in an exchange structured according to the application modularity concept, FIG. 12 shows a call going through such an exchange. The application module to application module protocol illustrated in exchange B of FIG. 12 is an internal type of protocol, i.e., one which is only used for communication between application modules located in the same exchange. Instead of using the message transfer part (MTP) as an end-to-end carrier for layers 1–3, the application module protocol makes use of the services offered by the transaction manager resource module included within the system of the present invention. The application module to application module protocol is documented and provides specific formats of messages, coding of information fields, and other procedures which are specific to that protocol covering layers 4–7. Within these protocols there may be a number of specific and different application module to application module protocols.

The differences between an "external" protocol functional specification, e.g., ISUP, and a "internal" protocol functional specification, e.g., NIIP, include the following:

1. An external protocol is required to carry the data concerning the physical resources involved, e.g., PCM channels, and how those resources are tied to the calls. This requires that operation and maintenance procedures and messages are included in order to handle these resources, e.g., blocking, etc. Such is not the case for internal protocols, as there are no physical resources being used, only logical circuits.
2. The length of messages, message structures and coding of information may differ between internal and external protocols since they are using different carriers for the layers 1–3, i.e., the MTP services or the transaction services.
3. Internal protocols may require additional information regarding, for example, session references for charging output, logic circuit references, etc., that are not required within an external protocol.

Some of the common elements between external and internal protocols is that both should be able to satisfy the following:

1. Both should handle "hostile" environments since things occasionally go wrong and messages disappear and, therefore, require timers to guard against this possibility;
2. Both should not reflect the internal structure of the application modules or the structure of particular manufacturers, hardware;
3. Neither should assume a specific user of the protocol; and
4. Both should be "complete" in that they cover all layers 1–7.

The application module to resource module communication is structured in the form of a system interface seen from the application module's point of view, i.e., both elements of the communication are contained within the same environment, i.e., within a common control system. Application module protocols are peer-to-peer communication, while application module to resource module interfaces are client to server oriented. The user interface to a resource module may consist of PLEX signals and the interface is described in an interface specification. A resource module has an identical interface to all AMs/RMs which does not allow any unique signals to be sent from an RM. In order to perform a service one RM can call upon the services of other RMs. FIG. 12 illustrates an example of an application module using the interface, and therefore, the services from a transaction manager resource module. The following points should be observed when structuring the layout/look of the resource module interfaces:

(a) Geographical distribution is not a factor to be considered since the resource modules can only be accessed within the same system;
(b) Different manufacturers of equipment are not a factor to be considered since the resource modules are all contained within a single system;
(c) Different users are a factor to be considered in that resource modules are used by different application modules and offer different physical services to those application modules; and
(d) A client/server relationship should be maintained between the communication with the resource modules.

In documenting the interfaces to be used within the system of the present invention, such interfaces can be specified by software signals comprising the messages and coding information. Each resource module may offer a number of different services, there may be a number of different interfaces. For example, the current design rules in the message transfer parts of conventional protocols are good examples of such application module/resource module interfaces. Thus, such interfaces can then be specified along with the number of software signals needed to perform the service offered by the resource module. One such interface may include the current design rules for using the message transfer part services within the common channel signalling subsystem (CCS) of the AXE-10 SPC switching system.

Access Structure Within Application Module Networks

The term "access" is used herein for the means needed by a user to reach the user services that are subscribed to in the communications system. The following discussion will identify these means in the form of components or functional entities using an object oriented approach. Such an approach supports rapid development in the required accesses by allowing a clear separation between technology and functionality, between access and user services, and between traffic handling and operations and maintenance. The components identified define an access object structure which can be used as a base when defining the access product structure.

In the access area of the present system there are two access application modules, an analog access application module (AAM) and a digital access application module (IAM). In structuring the access within the present system certain basic principles are followed:

1. Access and user services are separated and, thus, no subscriber knowledge, subscriber data or user services are part of the access application modules.
2. Physical distribution of the access application modules is enabled by a network protocol between the access application modules and the service application modules.
3. Physical distribution of switches within the same switching system is hidden from the switch users. This is achieved by defining a communications interface to a connection manager resource module which governs the different switches in the switching system.

4. Functionality and technology are separated from one another. That is, technology, i.e., the low layer (OSI layer 1–2) functionality is independent of the high level functionality, such as user services implemented in the telecommunications network, by defining low layer protocols carrying no high level knowledge. This enables reuse of the technology by a variety of high level functionality.

Referring now to FIG. 13, it is illustrated that a telecom network 200 includes a number of distinct functional units in order to perform its intended purpose. In order to perform a telecommunication service for a user the network 200 includes an access component 201, a user service entity (USE) 202 and a network service entity (NSE) 203. The user may include either a human being, an application program or other users which seek to make use of the user services that are subscribed to within the telecom network 200. The access 201 provides the means needed by the user to reach the user services which are subscribed to. The user service entity 202 offers and executes services to the user that are being subscribed to by handling service interactions, charges to the entity that has subscribed to the services and the like. The network service entity 203 provides information transfer capability and services, for example, provides bearer service and capabilities as described by the CCITT in recommendation I.210.

Referring next to FIG. 14, there is shown how the service access that the service application module 204 employs in the system of the present invention includes the user service entity 202 as well as the network service entity 203. The service application module 204 is in turn accessed by the user through an access application module 201. FIG. 15 shows the different physical access products on a switching network level and illustrates that users may access a switch 205 within a switching system 206 either directly via the centrally located subscriber switch (SSS) 207 or remotely through a remote subscriber switch 208 and a transmission network 209. FIG. 16 illustrates that a user may access any number of versions of switches 206a–206c within a switching system 206 through a transmission network 209 employing standard protocols via an independent access product 210, such as an access multiplex concentrator (AMC). Such a product 210 is in itself a homogeneous switching system that can serve other homogeneous switches systems with access services on a switching network level regardless of which of the particular switching systems 206a–206c is being accessed.

FIG. 17 illustrates a functional division of the telecommunication network and when implemented in a physical network, such functional components are mapped onto the physical components comprising the network. In principle, the functional components should be independent of the physical reality into which they are implemented and vice versa. Thus, the approach of the system of the present invention is to separate the functionality from the physical hardware used to implement the telecommunications network.

Within the access portion of a network, the functional parts are to be mapped onto the physical reality embodied in the different physical access products, such as a remote subscriber switch (RSS), an access multiplex concentrator, an access multiplexer (AMX), and a subscriber line circuit (SLC-96). One example of a mapping of the functional parts onto physical access products is shown in the illustration of FIG. 17. This diagram separates the functional parts 211 from the physical components 212 and illustrate access being mapped upon the several physical access products 210a–210d while the user service entity 202 is mapped upon the products 210c and 210d, which can perform that function as well as the group switch (GS) 210e. The network service entity 203 is mapped upon the group switch 210e. The discussion immediately below focuses on the functional decomposition of the access 201 to the system.

Figure 18:
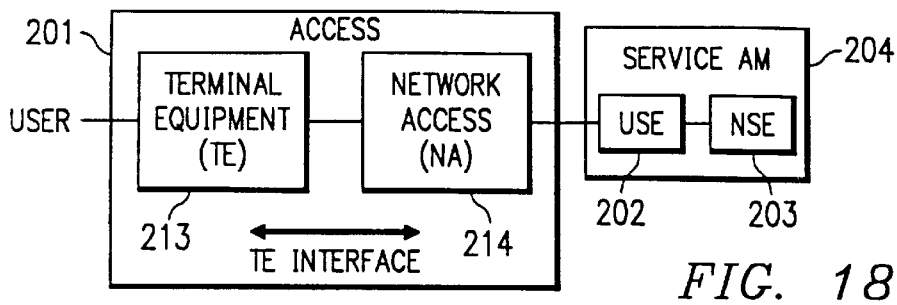
FIG. 18 is a block diagram illustrating telecommunications interfaces related to the system of the present invention.

Referring to FIG. 18, access 201 is shown as interfacing with a service application module 204, which includes the user service entity 202 and the network service entity 203. The access 201 comprises terminal equipment (TE) 213 with which the user directly connects, which is, in turn, interfaced with network access (NA) 214. As far as access functionality is concerned, no subscriber knowledge, subscriber data or user services form part of the access. The desired flexibility, stability and quality of the access cannot be achieved if a mixture of functionality, as illustrated above in connection with FIG. 17, is applied to the access modules. In nearly all cases there is an open interface to the user. Thus, the user needs terminal equipment 213, such as telephones, PCs, etc., in order to adapt to the terminal equipment interface. In addition, the network access (NA) 214 connects the terminal equipment to the telecommunications network, for example, at the telephone jack or at the network termination. The network access 214 serves to provide the functionality needed for the terminal equipment to reach the user services desired.

Figure 19:
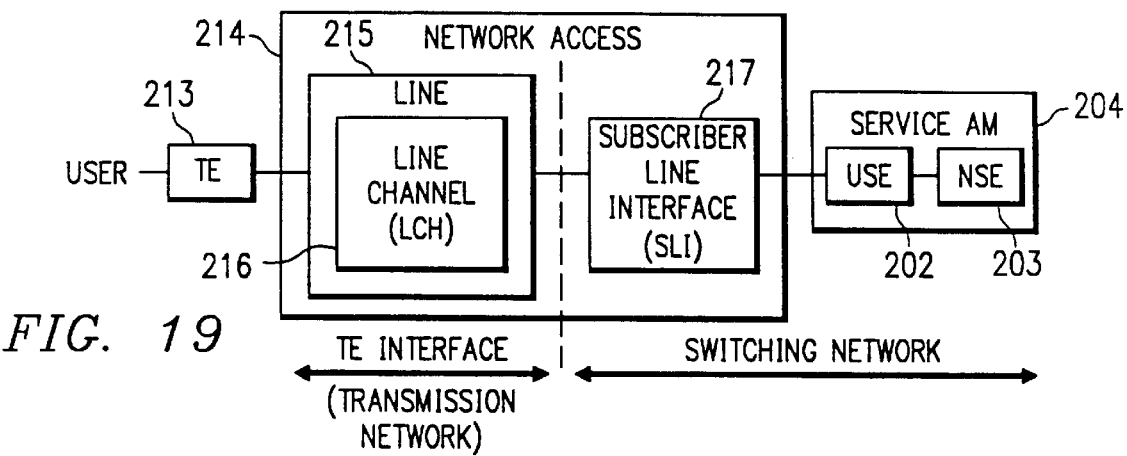
FIG. 19 is a block diagram illustrating communication access within the system of the present invention.
Figure 20:
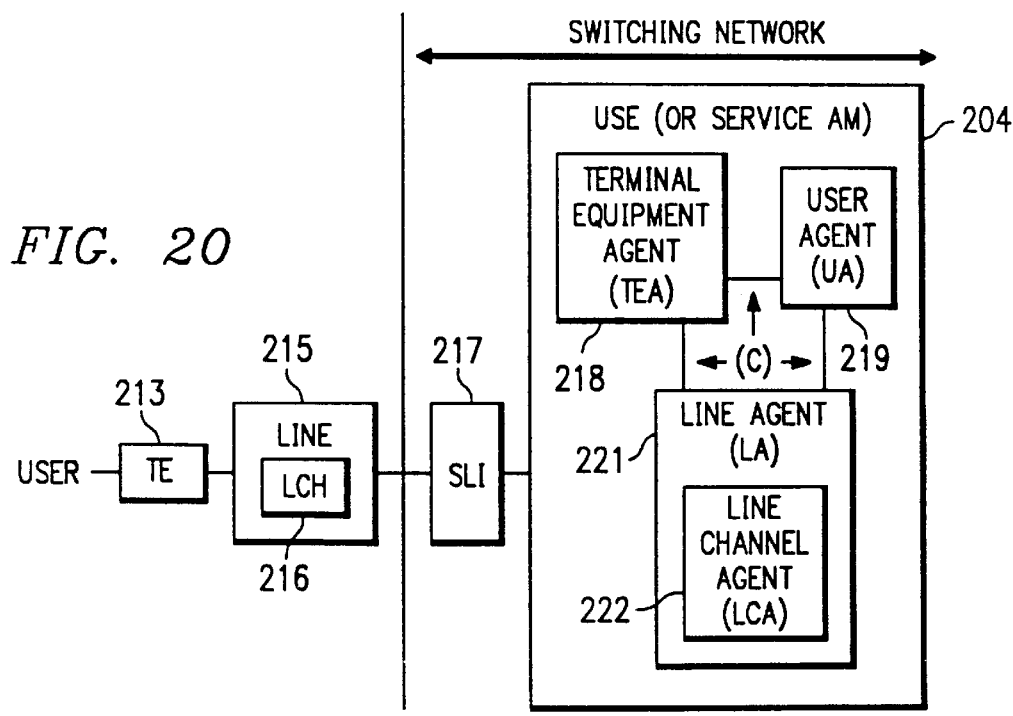
FIG. 20 is a block diagram illustrating communication with an application module within the system of the present invention.

The network access 214 may be decomposed into functional component as shown in FIG. 19. There the network access 214 bridges the gap between the terminal equipment interface and the switching network by including line 215 made up of line channel (LCH) 216, forming part of the transmission network, with a subscriber line interface (SLI) 217. The line 215 provides the physical connection between the terminal equipment 213 and the switching network to carry the terminal equipment interface between the terminal equipment and the switching network. It thereby enables physical distribution of the terminal equipment 213 and is usually implemented as a transmission facility. The line channel (LCH) 216 is a subset of the line's transmission capability aimed at dedicated use between the terminal equipment and the switching network and thereby enables multiple uses of the line 215. The subscriber line interface 217 connects the line 215 to the switching network, usually at the main distribution frame (MDF) and thereby provides the functionality needed for the line 215 to reach the user services. FIG. 20 illustrates the access related parts in the user service entity (or service application module 204). In the user service entity 204, the access is modelled by agents for the terminal equipment 213, the line 215 and the line channel 216 within the line 215. The terminal equipment agent 218, the line agent 221 and the line channel agent 222 hide the physical distribution of lines and terminal equipment in the access for the rest of the user service entity. In addition, the user is represented by an agent 219, which provides the means for finding the user services and handles the charging matters for the user. In this way, mobility, moveability and semifixed subscribers are implemented in a user service entity through the handling of the connections between the user agent 219, the terminal equipment agent (TEA) 218 and the line agent 221, including the line channel agent (LCA) 222. The user agent 219 is the user, s representative in the telecommunication network and provides the means for finding the user services and handling charging matters for the user. The line agent 221 represents the line 215 within a user service entity 204. The terminal equipment agent 218 represents the terminal equipment in the user service entity 204, while the line channel agent 222 represents the channel on a line within a user service entity 204.

Figure 21:
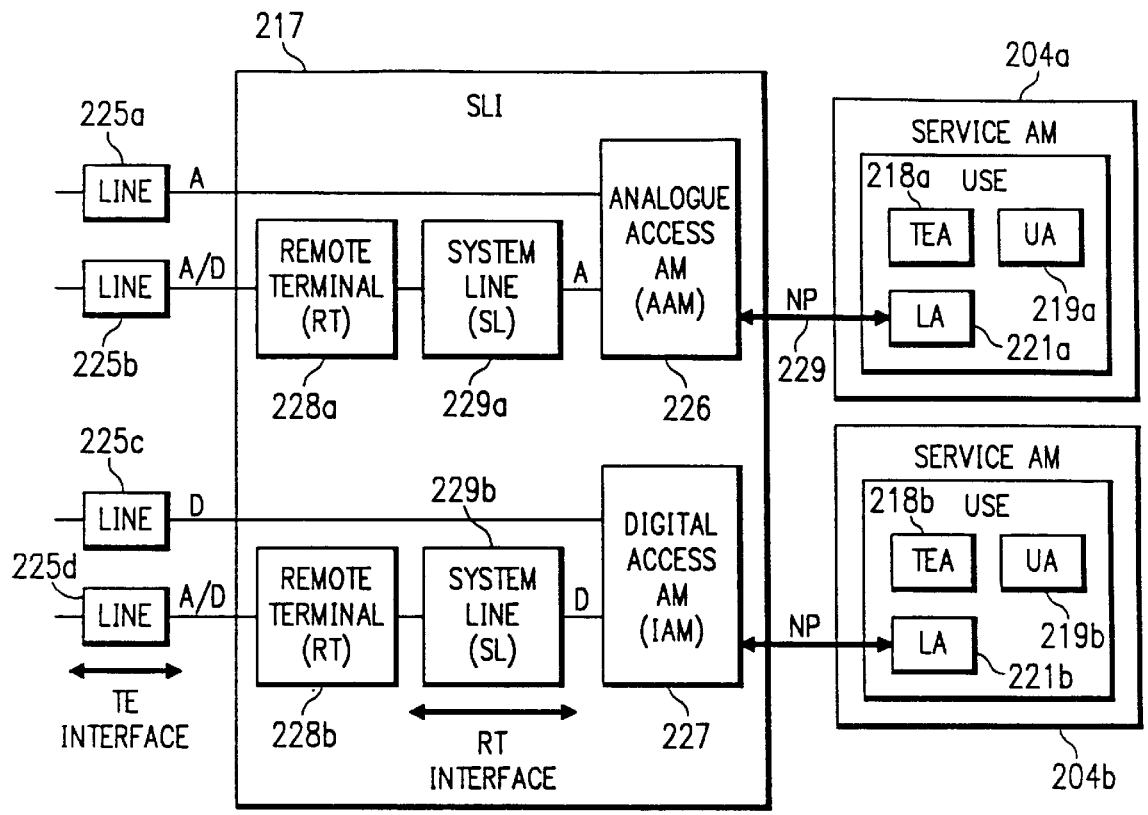
FIG. 21 is a block diagram illustrating communications between subscribers and application modules within the system of the present invention.

Referring next to FIG. 21 there is shown a functional decomposition of the subscriber line interface 217 serving to provide access for a plurality of analog and digital lines 225a–225d to service application modules 204a and 204b. As discussed above, each of the service application modules include user service entities 202a–202b, which are made up of terminal equipment agents 218a–218b, user agents 219a–219b and line agents 221a–221b. The subscriber line interface 217 includes an analog access application module 226 and a digital access application module 227. The incoming analog line 225a is coupled directly to the analog access application module 226 while the incoming digital line 225c is coupled directly to the digital access module 227. The incoming line 225b is coupled through a remote terminal (RT) 228a and a system line (SL) 229a to the analog access application module 226. The incoming line 225d is also connected through a remote terminal 228b and a system line (SL) 229b, forming a remote terminal interface, to the digital access application module 227. As shown in FIG. 21, in the access there are two access application modules 226 and 227, one providing analog access 226 and one providing digital access 227. The particular type of access given is determined by the type of terminal equipment/remote terminal interface, i.e., whether it is analog or digital, that is using the lines/system lines directly connected to the access application module. The access application modules 226 and 227 translate the access protocols used on the terminal equipment/remote terminal interfaces to semantical network protocols (NP) 229 to the line agents 221a–221b of the user service entities 202a–202b in the service application modules 204a and 204b. By use of the agents for terminal equipment, lines and line channels in the user service entities 202a–202b in the service application modules 204a and 204b and through having formalized network protocols to the access application modules, the physical distribution of lines and terminal equipment can be handled entirely by the access application modules 226 and 227 and be thereby completely hidden to the service application modules 204a and 204b. That is, the service application modules 204a and 204b do not have to consider where in the access the line/terminal equipment is connected as is the case in present architectures in use today. However, the manner in which OSI layers 3–7 of the network protocol to the access application modules 226 and 227 are handled will depend very much upon the particular services implemented in the telecommunication network. That is, new and changed services are likely to affect the network protocols 229 used to communicate between the access application modules 226 and 227 and the service application modules 204a and 204b.

With specific reference to FIG. 21, the remote terminals 228a and 228b adapt the terminal equipment interface used on the lines 225a–225d for a digital/analog access to a remote terminal (RT) interface used on a system line 229a–229b to the analog and digital application modules 226 and 227. The remote terminal interface itself may be either analog or digital, for example, interfaces such as IMUX, RSM, IDLC, SLC-96, etc. The system line 229a–229b provides the physical connections between the remote terminals 228a–228b and the analog/digital access application modules 226 and 227, for example, as a transmission facility connected to the main distribution frame (MDF). The system lines 229a–229b carry the remote terminal interface between the remote terminals and the analog/digital application modules 226 and 227, thereby enabling efficient use of transmission equipment. The analog access module 226 provides the functionality needed for the connected line/system lines used for carrying analog TE/RT interfaces needed to reach the user services and the user service entity 202a. The analog access application module 226 translates the protocols used on the TE/RT interfaces to semantical network protocols used in 229 between the analog access application module 226 and the line agent 221a of the user service entity 202a in the service application module 204a. Similarly, the digital access application module 227 provides the functionality needed for the connected lines/system lines for carrying digital TE/RT interfaces necessary to reach the user service entity 202b in the service application module 204b. This module translates the protocols used in the TE/RT interfaces to semantical network protocols used in 229 between the digital application module 227 and the line agent 221b in the user service entity 202b of the service application module 204b.

Figure 22:
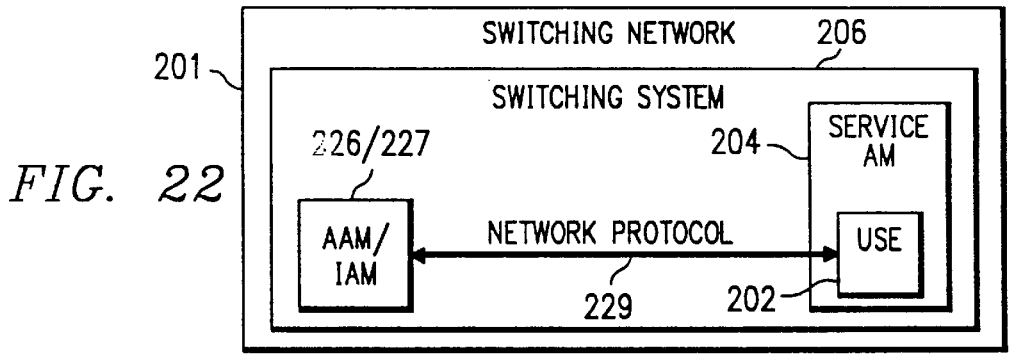
FIG. 22 is a block diagram illustrating communication between different application modules within the same switching system incorporating the system of the present invention.
Figure 23:
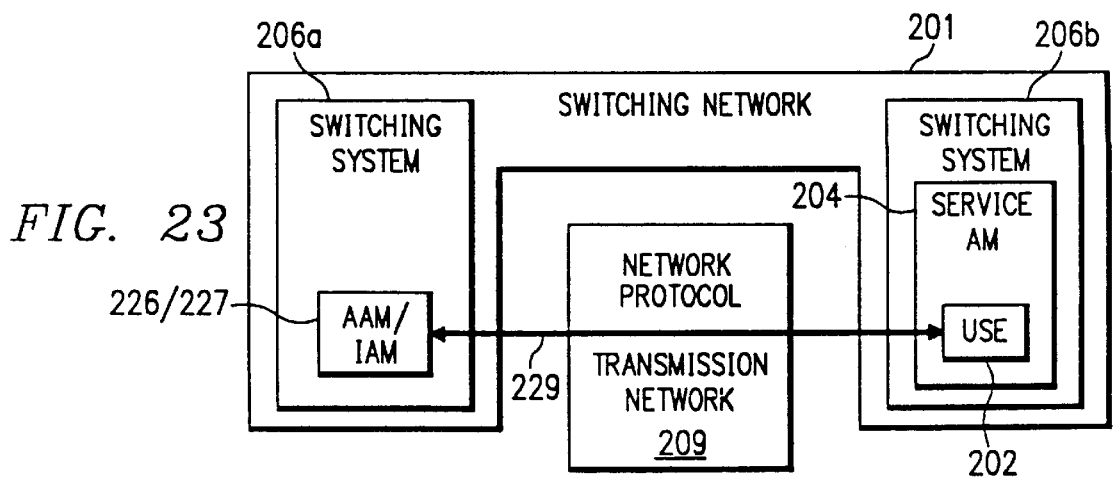
FIG. 23 is a block diagram illustrating communication between different application modules within different switching systems incorporating the system of the present invention.

One reason for having a network protocol to the access application modules 204a and 204b is that it will enable physical distribution of terminal equipment and lines in the switching network. In this way, the access application module can be mapped upon a physical access product in another switching system than the user service entity, as shown in FIGS. 22 and 23. In FIG. 22, a switching network 201 includes a switching system 206 comprising an analog access application module/digital access application module 226/227 in communication with the user service entity 202 of a service application module 204 via a network protocol 229. Similarly, in FIG. 23, a switching network 201 includes two switching systems 206a and 206b, one of which includes the analog access application module/digital access application module 226/227, while the other includes the user service entity 204 within the service application module 204. In this circumstance, the access module 226/227 communicates with the user service entity in the service application module 204 by means of the same network protocol 229, this time connected through a transmission network 209 rather than directly between the application modules themselves. Both switching systems 206a and 206b would also include interfaces toward the intermediate transmission network 209 in order to implement the network protocol 229 and communicate therethrough.

It should be noted that there is a difference between implementation of the access product interface and implementation of the physical access product itself. The physical access product is dependent upon the switching system in which it is implemented, while the access product interface is independent of such a switching system.

The subject matter of PCT patent application Ser. No. PCT/SE 91/00470, entitled "Stored Program Controlled Digital Public Exchange," filed in the name of Mats Ohlstedt on even date herewith and assigned to the assignee of the present invention, is hereby incorporated by reference herein. This application discloses subject matter related to one possible implementation of an access application module in accordance with one aspect of the system of the present invention.

Figure 24:
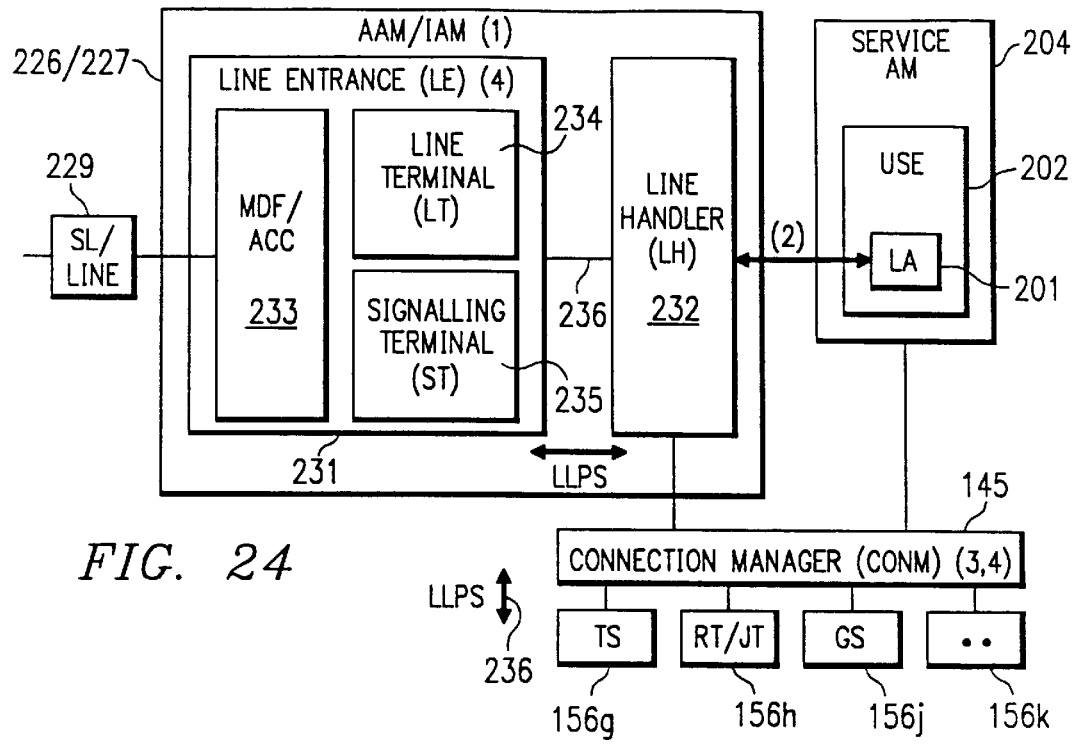
FIG. 24 is a block diagram illustrating the functional decomposition of an access application module and a connection manager resource module employed within the system of the present invention.

Referring next to FIG. 24, there is shown a functional decomposition of the analog/digital access application module as well as the decompositions of the line entrance (LE) 231 and a connection manager 145, illustrating their close relationship to one another. As illustrated, the analog/digital access application module 226/227 includes a line entrance (LE) 231 and a line handler (LH) 232. The line entrance 231 comprises a main distribution frame/automatic cross connect (MDF/ACC) 233, as well as a line terminal (LT) 234 and a signalling terminal (ST) 235. A connection manager resource module 145, for example, including access to a time switch 156g, a remote terminal/juncture terminal 156h, a group switch 156j and other hardware 156k, provides connection services to both the line handler 232 and to the service application module 204. The line entrance 231 provides the physical medium that connects the system line 229 to the analog access application module/digital access application module 226/227. This physical medium handles the conversion between the electrical values on the line/system line 229 and the internal representation (electrical/logical) in the switching system itself. It also subtracts and supports the signalling part in the TE/RT interface. That is, it handles roughly layers 1 and 2 in the OSI protocol for the communication with the TE/RT. The functionality of the line entrance 231 is implemented in the MDF/ACC 223, the LT 234 (which handles roughly the OSI layer 1) and the ST 235 (which handles roughly OSI layer 2). The line handler 232 provides the means needed for the line entrance 231 to reach the user services in the user service entity 202 of the service application module 204. It coordinates signalling and line handling activities such as seizure of lines and line channels, and also orders the connection manager 145 to set up signalling connections between the line terminals 234 and signalling terminals 235. The connection manager 145 handles the physical connection, i.e., the paths, in the switching system and in the process of conducting these activities, handles the various switch components such as the time switch 156g, the remote terminal/juncture terminal 156h, the group switch 156j and others. In the access application module 226/227, low layer protocols are defined to the line entrance 231 with respect to line terminals 234 and signalling terminals 235. In this sense, the line entrance 231 clearly is a candidate to be implemented as a resource module. In such cases, for example, market variations would affect mainly the line handler 232. For the connection manager, low layer protocols should be defined to the different switches used, for example, to the time switch 156g and group switch 156j. In general, the technology, i.e., the low layer OSI, layer 1–2, functionality should be independent of high level functionality such as user services implemented in the telecommunication network. Technology could be separated from the high level functionality through defining low layer protocols (LLP) carrying no high level knowledge. These low layer protocols would only be affected by changes in technology and, in this way, the same technology could be reused by a variety of high level functionality. Lower level protocols 236 are used between the line entrance 231 and the line handler 236 as well as between the connection manager 145 and the respective switch elements 156.

In FIG. 21, the fundamental principals behind the decomposition of the access is set forth as follows:

(a) The access product area is allocated to access application modules to cope with increasing access functionality. No subscriber knowledge, subscriber data or user services is part of the access application module. That is, there is a clear separation between access and user services;

(b) Physical distribution of the access application modules is enabled through network protocols to the user service entity;

(c) The physical distribution of switches is hidden to the switch users by the connection manager used as global resources in the switching system; and (d) Technology such as line terminals, signalling terminals and switches can be used as global resources through low layer protocols carrying no high level knowledge. That is, there is a separation between the functionality and the technology.

Figure 25:
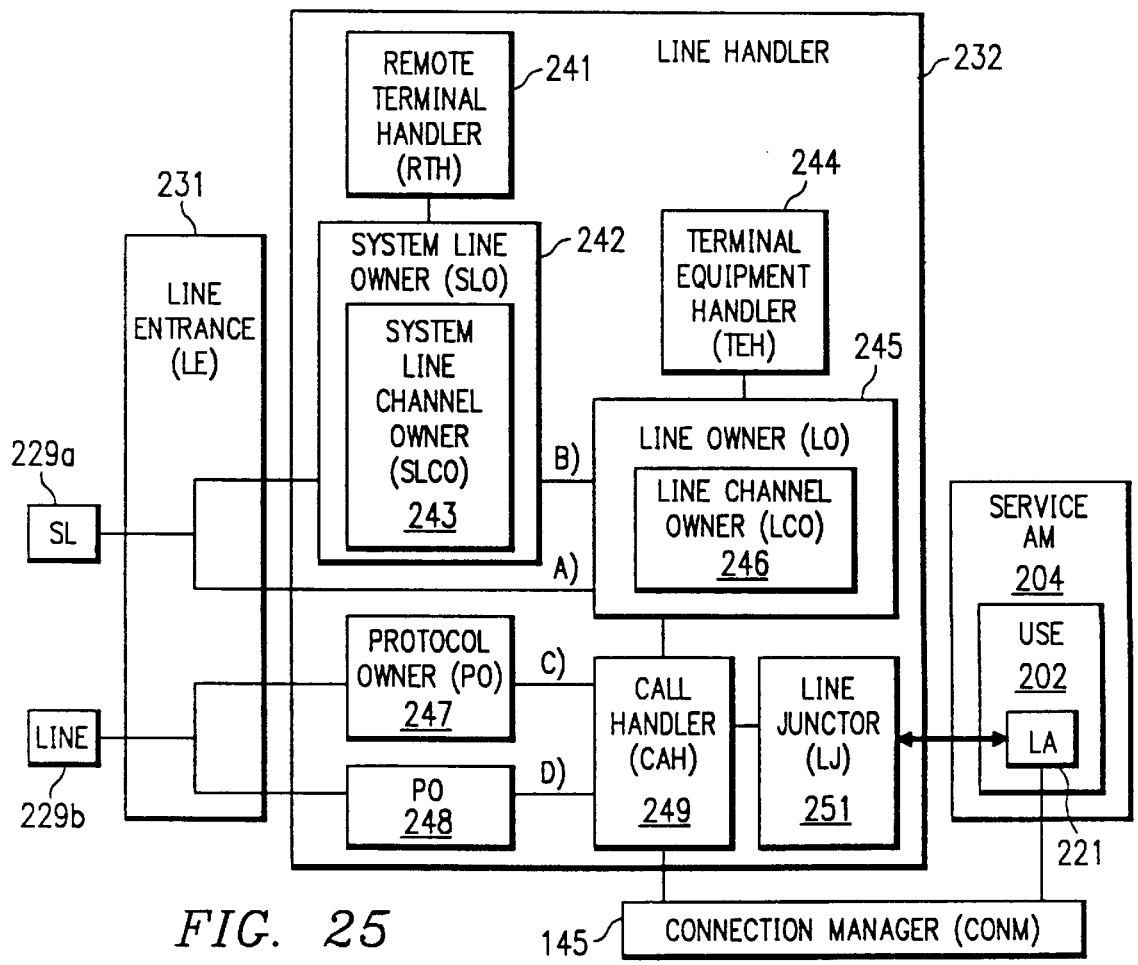
FIG. 25 is a block diagram illustrating the functional decomposition of a line handler within an access application module employed within the system of the present invention.

Referring next to FIG. 25, the functional decomposition of the line handler 232 is shown. There it is shown how an SL 229a and line 229b are interfaced through a line entrance 231 and the line handler 232 to the service application module 204. The line handler 232 includes a system line owner (SLO) 242 which includes a system line channel owner (SLCO) 243 and which is connected to a remote terminal handler (RTH) 241. The SL 229a is both directly connected to a line owner 245 as well as indirectly connected through the system line owner 242. The line owner (LO) 245 includes a line channel owner (LCO) 246 and is similarly connected to a terminal equipment handler (THE) 244. The line 229b is connected through a pair of protocol owners (PO) 247 and 248 to a call handler (CAH) 249, and a line juncture (LJ) 251 into the line agent (LA) 221 of the user service entity (USE) 202 of the service application module 204. The line agent 221 and the call handler 249 are both coupled to the connection manager resource module 145.

The line entrance 231 provides the physical medium that connects the line 229b or the system line 229a to the analog access application module/digital access application module. This medium handles the conversion between the electrical values on the line/system line and the internal representation (electrical/logical) in the switching system. It supports the signalling part in the TE/RT interface by handling roughly layers 1 and 2 in the OSI protocol for the communication with the TE/RT. The remote terminal handler 241 handles remote terminal data usually used for maintenance activities. The system line owner 242 provides the logic required to handle the system line toward the remote terminal and handles, for example, system line channels, support system line maintenance, etc. The system line channel owner 243 owns a channel on the system line. The protocol owners 247 and 248 perform the OSI layer 3 functionality needed in the switching system for the communication with the TE/RT. The terminal equipment handler 244 handles terminal equipment data such as terminal equipment identification data. The line owner 245 provides the logic required to handle the line toward the terminal equipment. It handles, for example, line channels, support line maintenance, etc., either directly through the line entrance or indirectly through seizure of the system line resources needed. The line channel owner 246 owns a channel on the line. The call handler 249 coordinates protocol and line handling activities, such as seizure of lines and line channels. It associates appropriate protocol owners, for example, protocols C and D, to the line owners. It also orders the connection manager resource module 145 to set up connections required to associate the protocol owners with the line owners. The line juncture 251 provides the means needed for the call handler 249 to reach the user services in the user service entity 202.

Figure 26:
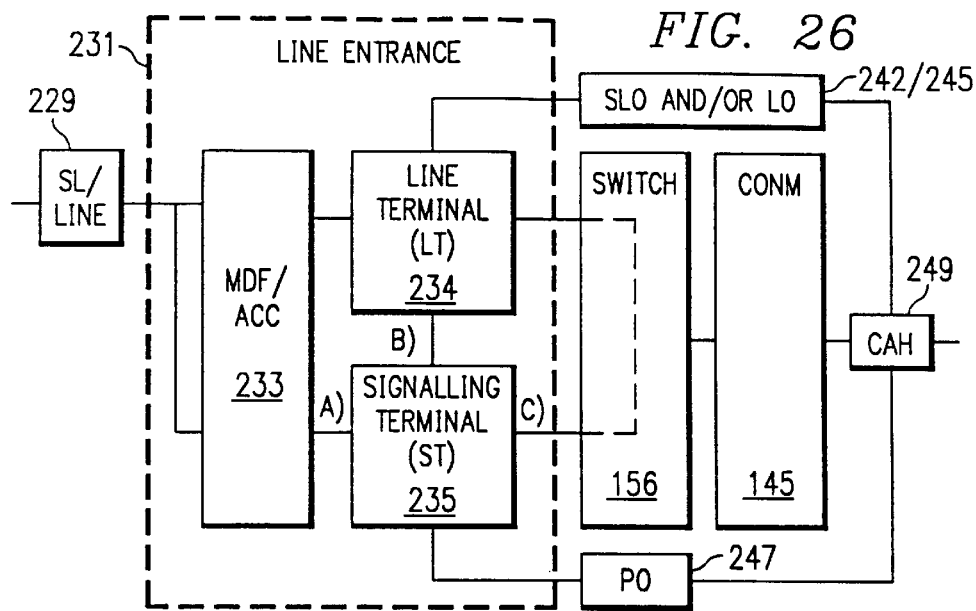
FIG. 26 is a block diagram illustrating the functional decomposition of a line entrance within an access application module employed within the system of the present invention.

Referring next to FIG.26, the functional decomposition of the line entrance 231 is illustrated along with the way in which it provides coupling between the SL/line 229 and the other components. The line entrance 231 includes the main distribution frame/automatic cross connect (MDF/ACC) 233, a line terminal (LT) 234 and a signalling terminal (ST) 235. Both the line terminal 234 and the signalling terminal 235 are connected into the switch 156 which is, in turn, connected through the connection manager resource module 145 to the call handler 245. In addition, the line terminal 234 is connected to the call handler 249 through the system line channel owner and/or line owner 242/245, while the signalling terminal (ST) 235 is connected to the call handler 249 through the protocol owner 247. The line terminal 234 handles the equipment which performs the conversion between the electrical values on the physical wire toward the TE/RT and the electrical values in the switching system, i.e., roughly OSI layer 1. The signalling terminal handles the equipment which, for the communications with the TE/RT, performs the conversion between the electrical values on the physical wires toward the TE/RT and the logical values in the switching system, i.e., roughly OSI layer 2. The signalling terminal can be connected to the line/system line 229 through the MDF/ACC 233, for example, as SE-EQM in the AXE-10 switching system, the line terminal 234, for example, as ST-ET for the primary rate access in AXE-10 switching system, or the switch 156, for example, as the 2B1Q basic access in AXE-10 switching system. The main distribution frame/automatic cross connect (MDF/ACC) 233 connects the line/system line 229 to the line terminal 234 and/or signalling terminal 235. The switch 156 performs the actual physical switching activities and is implemented as a group switch, time switch, etc. The line terminals 234 and signalling terminals 235 and the MDF/ACC 233 have dedicated maintenance.

Figure 27:
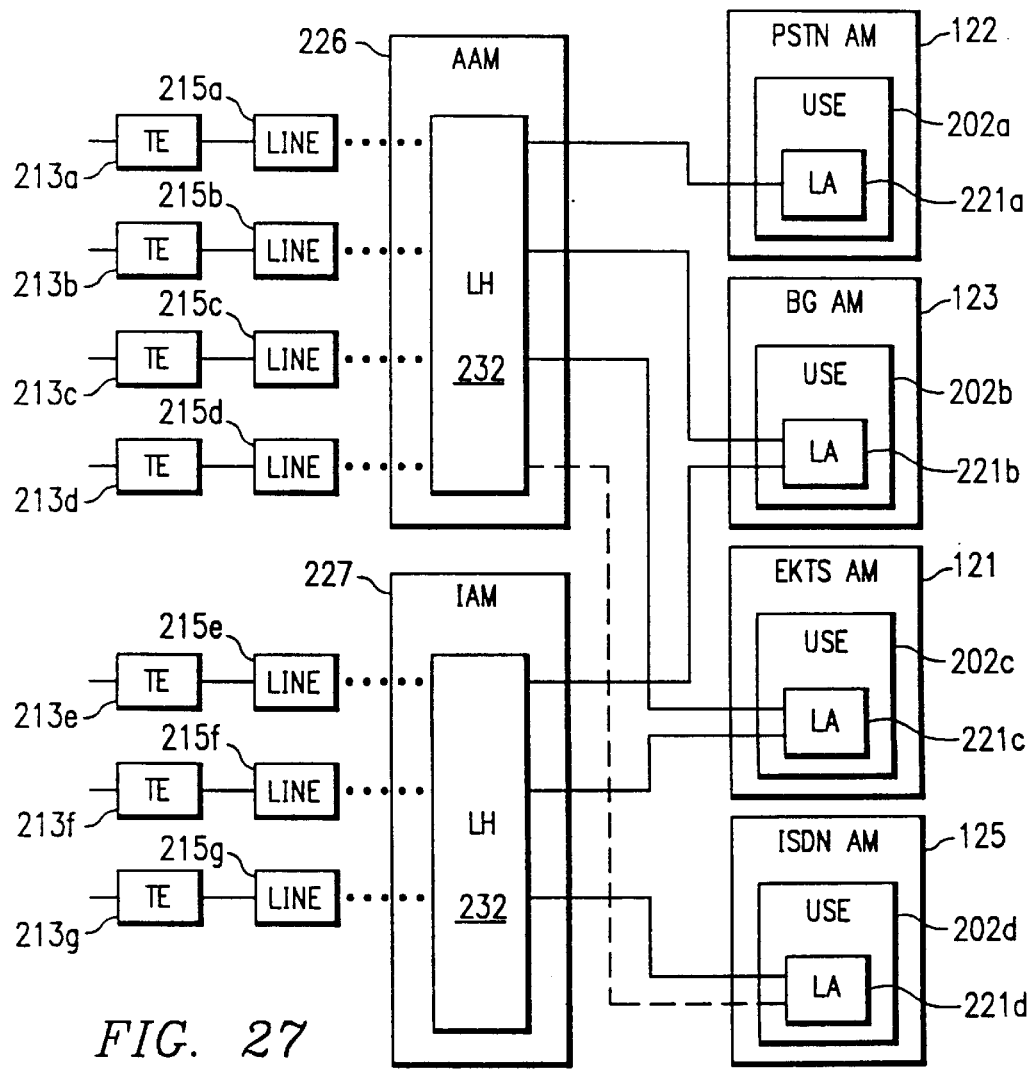
FIG. 27 is a block diagram illustrating the relationship between line functions within access application modules and different service application modules within the system of the present invention.

Referring next to FIG. 27, one of the main tasks for the line handler 232 within each of the analog access application modules 226 and digital access application modules 227 is to provide the means for lines 215a–215g and terminal equipment 213a–213g to reach the user services in appropriate user service entities 202a–202d within the respective service application modules 121–125. In principal, each piece of terminal equipment 213a–213g may be connected to different user service entities 202a–202d which means that the line handlers 232 must be able to read messages on a line and terminal equipment basis. In addition, the required channel within the line may be indicated, which means that the semantics of the network protocols between the access application modules 226 and 227 and the user service entities, the line, terminal equipment and the channel within the line are needed as keys, as illustrated in FIG. 27. It is up to the user service entities 202a–202d to reject user services not supported by the network protocol to a specific line. For example, each type of access could have the possible user categories defined in the user service entities 202a–202d.

Application Module System Specification

Figure 28:
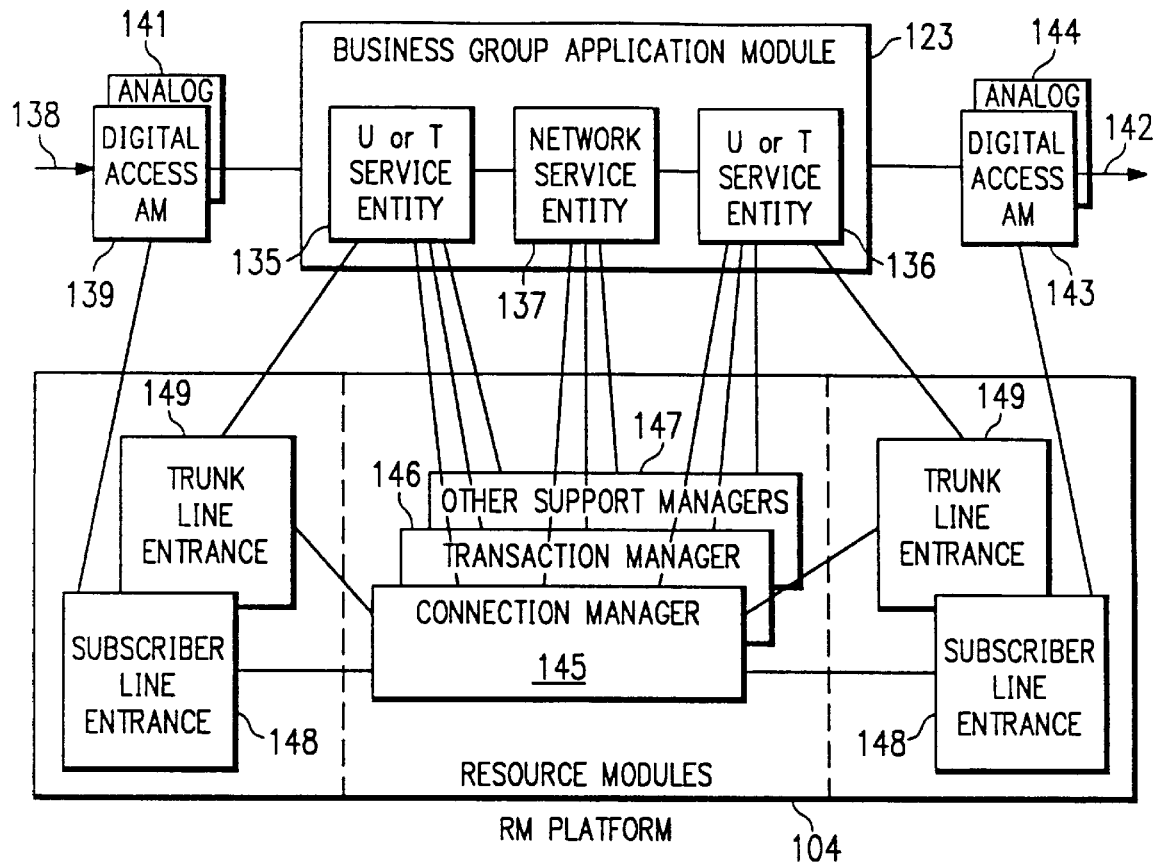
FIG. 28 is a block diagram of access and service application modules and supporting resource modules constructed in accordance with the system of the present invention.

The system level description specifies the components of an application module, such as the business group application, and their interworkings. Referring to FIG. 28, there is shown the basic implementation structure of a business group application module. The business group module itself 123 provides the implementation in software of a business group communications application within an exchange. It contains the service logic for business communication in which a call requires a minimum of three object instances. Typically, there will be one network service entity instance 137 linking two others of either the user or terminating types 135 and 136. Line entrances 148–149 comprise line access hardware with some software associated with the interface. Such line entrances have no knowledge or understanding of any of the services supported. The transaction manager resource module 146 provides common facilities to all application modules to assist in the transport of signals. There are basically four types of communication links: those between service entities 135–137, those between accesses 148–149 and service entities 135–137 and those involving use of the transaction manager 146.

The transaction manager resource module 146 is a significant element in the implementation of the application modules and includes the function of being able to seize an application instance. One access type may support more than one than one service and hence, it must be able to be linked to more than one application type. The access will not know what service it supports and when the access detects a service request, it will send a seize message to the transaction manager. The transaction manager will know the source of the signal and use it to identify the appropriate data held for the device. That will identify the application type for which the new instance is to be seized. Similarly, if one application module needs to create an instance of a different application module type, it will also use the same mechanism.

As mentioned above in connection with FIG. 28, this diagram shows the software components involved in establishing a call within a business group. Within each application module 123, each call will normally involve three objects instances, two instances of the user or trunk service entity, one each for the two sides of the call, and those two instances will be linked by an instance of the network service entity. In addition, a number of the facilities provided by resource modules and accesses will be used in a call.

The network service entity 137 object type exists to link, for instance, two instances of user service entity or trunk service entity 135–136 in a simple call. It connects to any of them with the same standard protocol which maps simply into the inter-exchange protocol. The user service entity instances originating and terminating a call have the same interface to the network service entity regardless of whether they are on the same or separate exchanges. This ensures that services work in the same way across a network as across an exchange. The user service entity object type includes a user agent, which communicates with the user via the access which controls the hardware interface linked to the user's equipment. It also includes the logic for the user services. The trunk service entity object type includes logical functions for controlling intra-network links and controls the trunks via the trunk line entrance which controls the hardware interfaces to those trunks. Line entrances are used to provide a variety of interface related functions. Resource modules, including a standard transaction manager 146 and connection manager 145, are functions which are needed within the system. The transaction manager 146 is used for communication between service entities, even though its use is only mandatory between application modules and between application modules and accesses.

It will not be uncommon for business group calls to involve more than one application module type since any calls to the PSTN or even a call to a different business group will take this form. An additional component which would be employed in such calls is the gateway service entity (not shown). This object type provides gateways to other network types and is concerned with conversion from the internal protocol to the protocol needed to access the other application types. It is also concerned with charging. Finally, a business group management entity serves the purpose of managing the business group services.

External requirements to the business group application module are provided by the support platform it accesses which are available. The access is on the line access hardware with some software associated with the interfaces; however, they have no knowledge or understanding of any of the services provided. An instance of an access type will be seized for each interface of the relevant type configured. For each type, the number of instances equals the number of units of the relevant type configured. The function of all access types include:

(a) line terminating functions;
(b) equipment maintenance functions; and
(c) communication with appropriate user service entity type.

Each of these are associated with terminating equipment.

The resource modules within the system are an integral part of providing the support facilities necessary to enable the application module to function. The transaction manager resource module provides common facilities to all application modules to assist in the transport of signals. It establishes links between software components of different application modules and between accesses and application modules. The connection manager application resource module owns the switching hardware and other pool resources such as tone receivers, multijunctures, and the like. It enables the application modules to use these resources and resolves any conflicting demands for the same connections or resources. The operation and maintenance resource module is used to assist in the service management functions performed by the business group subscriber. The charging manager resource module is necessary because all calls internal to the business group will not be charged on a per call basis; however, calls going outside the business group can be expected to generate a call charged to someone. The gateway service module, therefore, relies upon the charging manager resource module for some of the generic charging functions.

The network service entity object type exists to link two instances of a user service entity, trunk service entity or a gateway service entity type in a simple call. It connects to any of them with the same standard protocol which maps simply to the inter-exchange protocol. The user service entity instances originating and terminating a call have the same interface to a network service entity regardless of whether they are on the same or separate exchanges. This ensures that services will work in the same way across the network as across an exchange. The network service entity includes two main components: the call agent and a directory agent. The call agent exists for the duration of a call to connect the two sides while the directory agent receives the B-number digits and, when the number is complete, returns a user trunk or gateway service entity type and where appropriate, an index number. The directory agent will exist at each node and provide a uniform interface to the call agent regardless of where the directory information is accessed from.

The user service entity object type includes a user agent which communicates with the user via the access which controls the hardware interface linked to the user's equipment. It includes the logic for the user services. This object type also includes call originating and terminating agents.

User agents exist for each user type within the application module being implemented. Each of the user types and a separate agent related to the functions required of the following user types in a business group application module would be provided: operator user agent, ordinary employee user agent, manager/executive user agent, secretary user agent, emergency phone user agent, service support point help line user agent, mobile user-paged user agent, mobile user-cordless user agent, mobile user-roaming user agent, homework user agent, hotline user agent, basic key set user agent, executive key set user agent, visitor's phone user agent, simple ACD answer point user agent, ACD agent user agent, ACD supervisor user agent, and ACD manager user agent.

The trunk service entity object type includes logical functions for controlling intra-network links and controls the trunks via the trunk line entrance which controls the hardware interfaces to those trunks. The network service entity identifies a route, and there are logical route related functions, such as alternative routing and validity checks on the link. There are also functions related to the trunk type and its functional capabilities.

Call originating or terminating agents normally combine an object between the user agent and call agent. This includes several types, including a call termination agent. There may be services invoked against the directory number which do not require the state of the call agent to be investigated, an example of which is immediate diversion. Even if there are no such services invoked, it is necessary to discover whether an instance of the appropriate call agent has been invoked for a particular user and if so, deliver the call attempt to it. A hunt or distribution group is registered and this module searches for a free group member and links to it. There is likely to be more than one version of such a group agent. Finally, with regard to queuing, calls are queued for several reasons; for example, operator or ACD services. The queue is held by this module.

Gateway service entity object types provide gateways to other network types. For each intra-network type protocol, there is an object which performs charging and protocol conversion functions.

General Implementation of Application Modules

Figure 29:
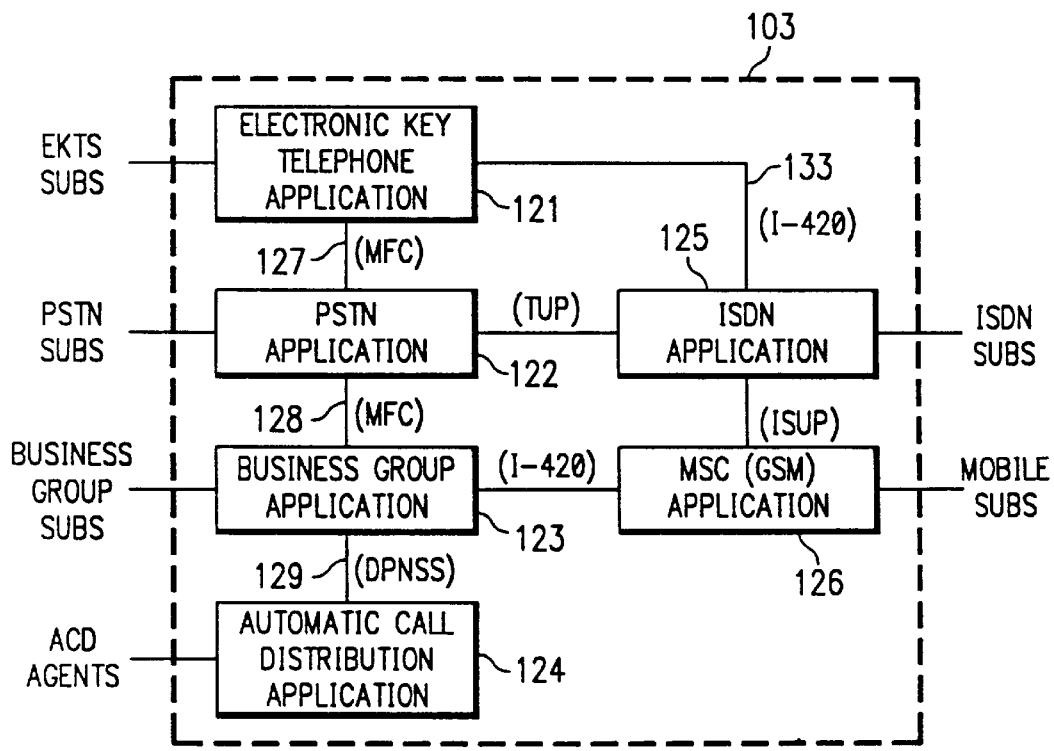
FIG. 29 is a block diagram of multiple application modules within a software architecture for a telecommunications exchange constructed in accordance with the present invention.

In the application modularity concept inherent in the software structure of the present invention, the system is divided into application specific areas. As illustrated in FIGS. 9 and 29, the APT portion 103 of the system is divided into a plurality of application modules which are designed to incorporate the functionality necessary to implement a particular type of telecommunications service. For example, the APT 103 may include an electronic key telephone application (EKTS) 121, a public switched telecommunication network application (PSTN) 122, a business group application 123, an automatic call distribution application (ACD) 124, an integrated services digital network (ISDN) application 125, and a mobile switching center (MSC) application 126. Each of the application modules 121–126 comprises a small telecommunication software system in its own right providing all of the service, traffic handling and charging requirements to implement telephone communication services for a specific type of end user. This modularity of applications reduces the software design problem to a manageable size and allows the different applications to be designed independently of one another and without any substantial coordination between irrespective module designs due to an elimination of conflicting solutions and requirements between the respective application module designs. Each of the application modules 121–126 are networked within the APT 103 by providing specific network protocols for communication between respective ones of the application modules. For example, the PSTN module 122 may communicate with both the EKTS module 121 and the business group module 123 by means of the respective MFC protocols 127 and 128. The business group application module 123 in turn communicates with the ACD module 124 by means of the DPNSS protocol 129 and with the MSC module 126 by means of the I-420 protocol 131. Similarly, the ISDN application module 125 communicates with the PSTN application module 122 via a TUP protocol 132 and with the EKTS module 121 via a I-420 protocol 133.

The networking of the software between the application modules 121–126 allows the creation of virtual switches within a single exchange in the same way that individual physical switches are interconnected with one another in a physical network. This arrangement produces a complete system solution in which each application module 121–126 is designed to meet the needs of its own users and in which the software structure is optimized for that particular application. Such an arrangement eliminates the need to specify or design telecommunication functions in a way that will work in all possible cases, in all possible applications, and for all possible users as is the case with current designs. Application modularity also reduces the need for the accumulation of total knowledge with regard to a function during the preparation of a requirements specification and design as well as leads to design solutions which are optimized from a processor loading point of view. In addition, the present software organization enables the use of new technologies, solutions and functionality in the same system as the existing software so that new solutions can be tested in actual use without affecting the entire system. This characteristic leads to further improvements in lead time, design cost and quality of product.

Referring next to FIG. 28, there is shown a block diagram illustrating an architectural overview of the way in which an exemplary service application module, such as a business group (BG) application module 123, interfaces with other application modules and resource modules within the resource module platform 104 in order to complete a call between two users within a business group. Within the business group application module 123, each call will normally involve three object instances of the user or trunk service entity types (USE or TSE) 135 and 136, one for each of the two sides of the call. These two instances, 135 and 136, are linked by an instance of the network service entity (NSE) 137. In addition, a number of facilities provided by resource modules and accesses will be employed in interfaces with the business group application module 123. For example, the A party user 138 will be linked to the BG module 123 by either a digital access application module (IAM) 139 or an analog access application module (AAM) 141, while the B party user 142 will also be linked to the BG application module 123 by means of a digital access application module 143 or an analog application module 144. Each of the service entities 135–137 are connected with a plurality of different resource modules located within the resource module platform 104. For example, the connection manager resource module 145, the transaction manager resource module 146 and other support manager resource modules 147 provide the necessary support services for the user and network service entities 135–137. Similarly, the connection and transaction resource modules 145 and 146 are interfaced with analog access resource modules 148 and digital access resource modules 149.

Within the business group application module 123, the user service entity 135 or 136 includes a user agent which communicates with the user via the access application modules 139–144, which control the hardware interfaces linked to the user's telecommunication equipment. The user agent of the user service entity includes the logic for providing the user's services. Similarly, the trunk service entity 135 or 136 includes the logical functions for controlling intra-network links. It controls the trunks via the trunk line entrances which control the hardware interfaces to those trunks. The various line entrances are used to provide a variety of interface related functions.

The network service entity 137 is an object type which exists to link, for example, two instances of user service entity or trunk service entity types in a simple call. It connects to any of them with the same standard protocol which maps simply into the inter-exchange protocol. The user service entity instances originating and terminating a call have the same interface to the network service entity (NSE) regardless of whether they are on the same or separate exchanges. This ensures that services will work in the same way across a network as across an individual exchange. The resource modules 145–147 provide standard transaction and connection management functions. The transaction manager resource module 146 is optional for communication between service entities 135–137 and mandatory between separate application modules and between application modules and accesses 148–149.

While FIG. 28 illustrates a call taking place between two users or trunks within the business group application module, similar entities are necessary in calls to be completed between a business group application module and another different application module, for example, the PSTN application module 122. In such a situation, an additional entity not specifically shown in FIG. 25, and referred to as a gateway services entity (GSE), is required and this object type provides gateways to other network types. Its primary concern is with conversion from the internal protocol within the application module, to the protocol needed to access the other application types. It would also be concerned with interworking and charging as a result of this interconnection.

Figure 30:
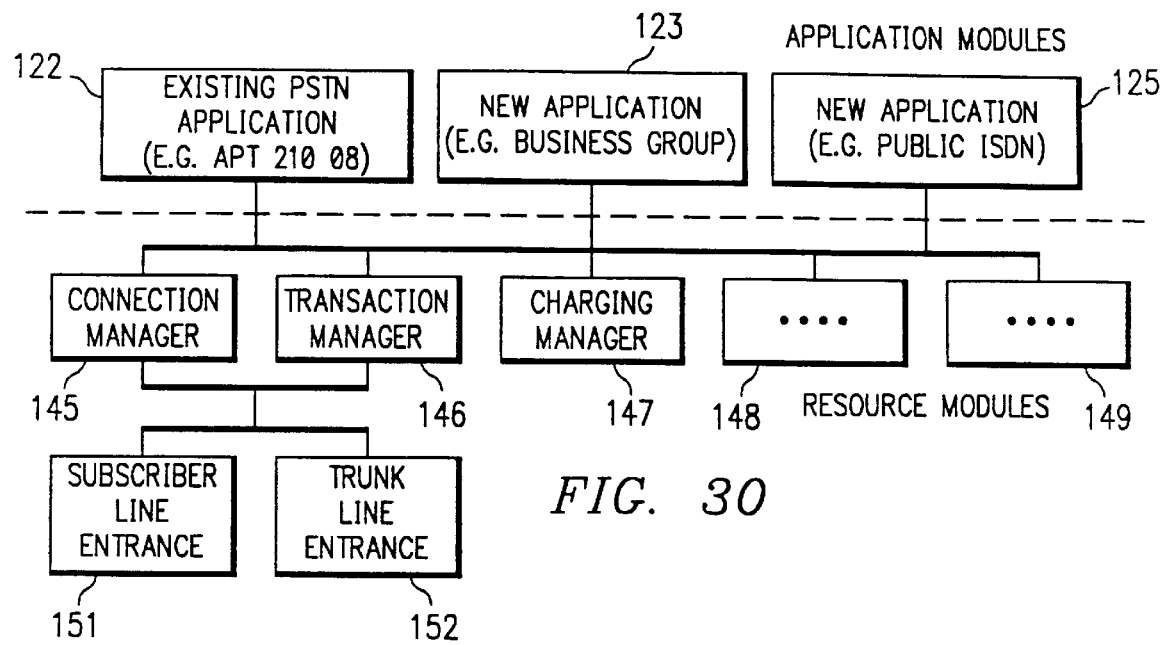
FIG. 30 is a block diagram of an existing application module and a pair of new application modules together with resource modules in a software system constructed in accordance with the present invention.

Referring next to FIG. 30, here is shown an additional overview of the system architecture of the present invention which includes a plurality of application modules, 122–125, and a plurality of resource modules 145–149. The application modules 122–125 contain the application's specific functionality, such as user services, traffic handling and routing. Since each traffic handling application module supports a simple call protocol, these modules are portable between different markets. For example, an application module designed for a business group in one country can be introduced into an exchange in any other market without the need for any additional design effort. Such modularity allows very fast introduction of existing applications into additional markets as they are needed. The resource modules 145–149 provide the system common functions, such as call signalling distribution between application modules, provided by transaction manager 146, switch handling and coordination, provided by the connection manager 145, and charging data collection and output, provided by the charging manager 147. In addition, the resource modules 145–149 provide tools for common routines to aid in the design of application modules. The nature of the resource modules 145–149 is such that they provide a good base for the design of network services along with the reduction of service interactions. The subscriber line entrance 151, and trunk line entrance 152, form part of both the connection manager resource module 145 and transaction manager resource module 146, and provide the interfaces to the outside world as well as the hardware and line supervision functions. They do not contain any applications specific or traffic handling functions. This structure not only provides a base for reducing the complexity of the application modules and the coordination of functionality between them, but also a good base for the introduction of new system concepts within the software.

As also illustrated in FIG. 30, the system of the present invention allows immediate reuse of existing application modules, such as an existing PSTN application 122. For example, a present PSTN function providing software system such as the APT 210 08 used in the Ericsson AXE exchanges, can be combined with new application modules 123 and 125. New system solutions have been thought of in the past to be problems of function change, improved restart handling and the like; however, the introduction of such new system solutions has commonly been rejected due to the need to rewrite the majority of the existing software in the system in order to implement them. With the present application modularity concept, new applications can have such facilities from the outset without the need to change existing software. The introduction of new application modules is rendered much easier due to the split between the pure software application modules and the hardware owning resource modules. This is due to the fact that it is most often the hardware owning software that causes the greatest obstacles to the introduction of new system concepts.

As exemplified in FIG. 30, new application modules 123 and 125 can provide entirely new solutions in functionality alongside existing solutions such as the PSTN application module 122. This, in effect, means that new technologies can be introduced constantly without the need to redesign previously designed application modules. For example, a version of forlopp restart may be included within each of the new application modules 123 and 125 so that a fault detected within these modules that would normally require an entire system restart can be isolated to affect only the call or command to which it relates. If such action is not enough to clear the fault, then all the software within the one particular application module can be restarted and only if both these actions failed would an entire system restart be required. Such new functionality can now be applied within each individual new application module and the affect of software faults on exchange performance will be greatly reduced. Similarly, new application modules, such as BG module 123 and ISDN module 125, can be designed in such a way that there is no need to disturb any existing call, either while it is in speech or being set up, while making a function change. In general, at the time of function change, all calls that have already been initiated will be handled by the old application module software and subsequent calls by the new application module software and, in effect, both application modules will be working in parallel for a short period of time. In addition, as the hardware is separated from the software of the application modules, it is possible to detect if a device has been left hanging. Such devices can then be released automatically and the application software can be reset using forlopp restart principles referred to above.

Figure 31:
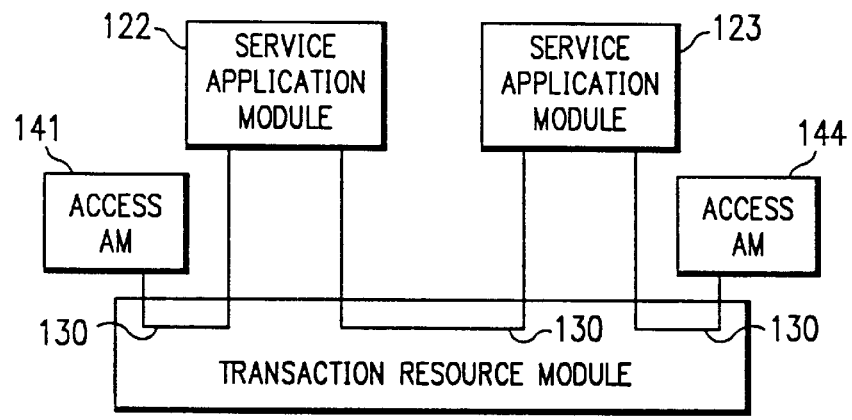
FIG. 31 is a block diagram illustrating communication between different access and service application modules in the system of the present invention.

Referring now to FIG. 31, there is shown a diagram illustrating the manner in which the transaction resource module 146 provides message transfer capability between respective ones of the service application modules 122 and 123 and the access application modules 141 and 144. The transaction resource module 146 includes the necessary protocols 130 to enable different application modules to communicate with one another.

Figure 32:
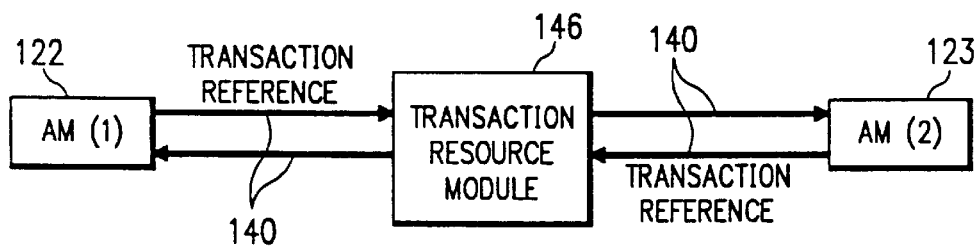
FIG. 32 is a block diagram illustrating communication between a pair of application modules through a transaction resource module within the system of the present invention.

Referring to FIG. 32, the message transfer capability of the transaction resource module 146 is illustrated more specifically through its role of providing communication between a first application module 122 and a second application module 123. One function of the transaction resource module 146 is to hide the physical location and type of cooperating application modules from one another. From either of the two application modules 122 and 123, all messages are addressed employing a transaction reference 140 which is translated by the transaction resource module 146 into the address of the cooperating application module for which the communication is intended. If the two cooperating application modules 122 and 123 are located in separate exchanges, then the inter-application module messages are passed via trunk line entrances to a physical signalling channel connecting the two exchanges to one another. In either case, the message sequences and message handling is identical whether the two application modules 122 and 123 are in the same exchange or not. The transaction protocols preferably include a two-layer structure. The lower layer is a generic session protocol that sets up and clears down calls between application modules which is then used to carry the upper layer or application protocol, which may be analogous to the subsignalling (SS), telephone user part (TUP), integrated services user part (ISUP), or mobile application part (MAP) protocols. This means that the seizing of records, i.e., instance handling, and basic call handling states can be separated from one another. In general, access application modules are designed to have as little functional influence on traffic handling as possible. In principle, they are transparent and simply convert the external physical signalling interface into an internal and easier to manage form. They do not, however, take care of additional maintenance functions and the time required when physical interfaces are used.

Figure 33:
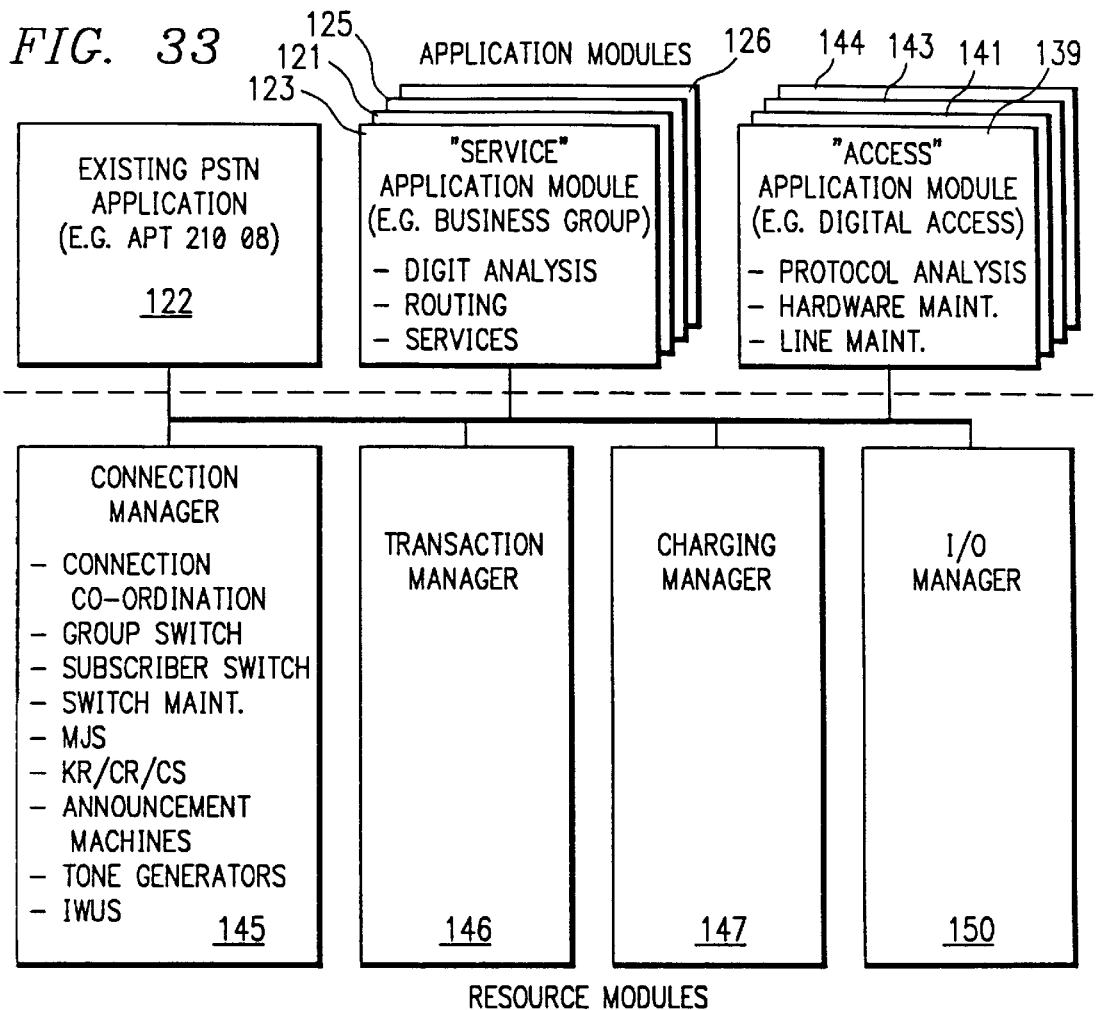
FIG. 33 is a block diagram of an existing application module together with a plurality of additional service and access application modules together with resource modules in the system of the present invention.

Referring next to FIG. 33, there is shown a block diagram of a plurality of service access application modules 121–126, and access application modules 139–144, along with a plurality of resource application modules 145–147 and 150. As illustrated, an existing PSTN application 122 could be readily combined with newly designed application modules such as the business group module 123. Functionally speaking, the service application modules 121–126 provide certain functions uniquely configured to their own individual applications for which they are provided. For example, their functionality may include digit analysis, routing, and unique telecommunications services which are specifically configured for the particular telecommunications application for which they are designed. Each of the access application modules 139–144 provide access functionality within the system and includes functionality such as protocol analysis, hardware maintenance, and line maintenance.

The resource modules illustrated in FIG. 33 include the connection manager 145, the transaction manager 146, a charging resource manager 147, and an input/output (I/O) manager 150, as examples of resource modules. Each of these resource modules provide functions which are common to one or more application modules and which enable those application modules to provide telecommunication service in accordance with the particular application for which they were designed. For example, the connection manager may provide connection coordination, and interface with both the group switch and the subscriber switch, switch maintenance functions, as well as multi-junctures (MJS), as well as key receivers/code receivers/code senders (KR/CR/CS). In addition, the connection manager 145 provides access to announcement machines as well as tone generators and internetworking units (IWUS). As discussed above, the transaction manager 146 provides interfaces between different application modules and enables communication between them. The charging manager 147 provides services to the application modules connected with the charging of calls in a manner related to common charging elements to each of the application modules. In addition, the I/O manager 150 facilitates input/output functions within both the resource modules and the application modules. It should be understood that the resource modules may call upon the functionality contained within the service application modules to provide their own support functions. For example, an announcement machine resource module may provide its services by calling out through a PSTN application module to reach the physical announcement machine hardware located in a different place from the exchange controlling that resource module. This may apply to other resource modules and resources.

Figure 34:
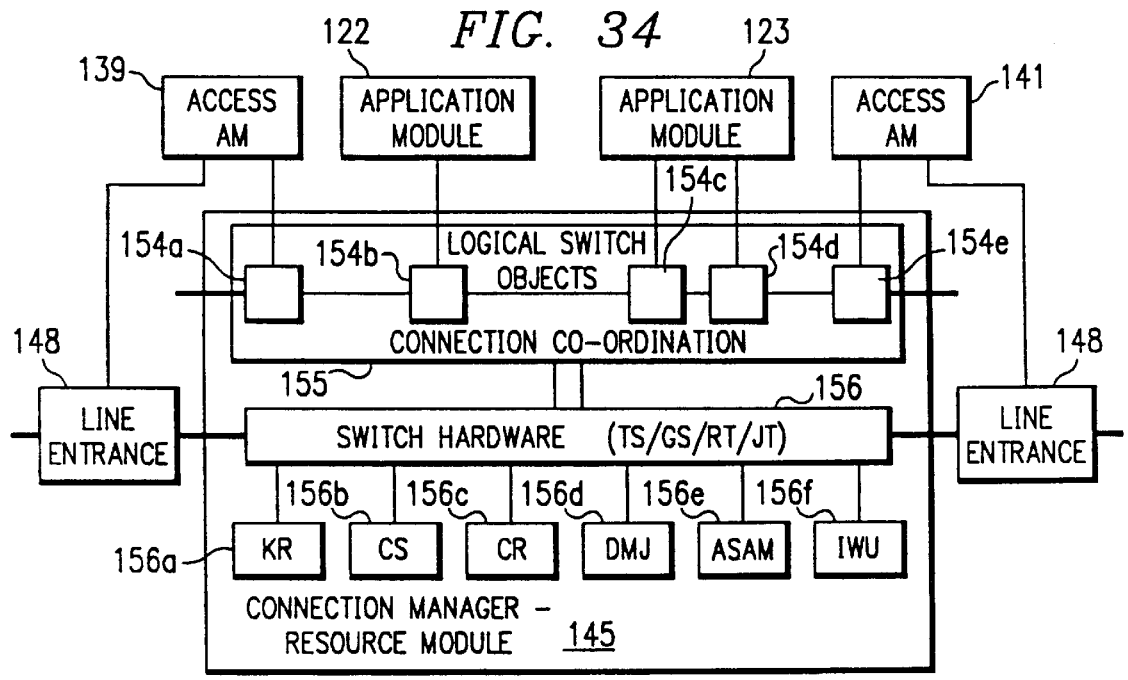
FIG. 34 is a block diagram of a plurality of hardware and software elements illustrating their interrelationship within the system of the present invention.

Referring now to FIG. 34, there is shown a block diagram illustrating the manner in which the connection manager resource module 145 functions to provide access to all switching functions within the system. That is, service application modules 122 and 123 and access modules 139 and 141 and line entrances 148 interface through logical switch objects 154a–154e within the connection coordination portion 155 of the connection manager resource module 145. These logical switch objects are located within level three of the system architecture (FIG. 9) which in turn coordinate the connection with the actual switch hardware 156, including time switches (TS), group switches (GS), remote terminals (RT) and juncture terminals (JT). The switch hardware 156 comprises the standard units now present within SPC telecommunication switches, including, for example, key set receivers (KR) 156a, code senders (CS) 156b, code receivers (CR) 156c, digital multi-juncture (DMJ) 156d, announcement machines (ASAM) 156e and internetworking units (IWU) 156f, each of which is owned by the connection manager resource module 145, which interfaces with the line entrance hardware 153 and 154 in coordination with the access application modules 139 and 141 to provide functional communication. As can be seen, in order to allow each application module to control connections without the need to coordinate between themselves, each application module is given its own logical switch objects 145a–145e to control. In order to achieve a complete connection in the real switch, these logical switch objects 154a–154e are linked together via their inlets and outlets to provide a picture of the complete speech path. From this picture, the real, i.e., physical inlets and outlets can be located and these are then connected together using the normal subscriber and group switch elements owned by the connection manager resource module 145. Each logical switch object 154a–154e is designed for a specific purpose and thus has a dedicated interface which means that operations on it are optimized. For most calls, only the access application modules will use logical switches for connecting and disconnecting code receivers and senders. The service providing application module only use simple connection objects that perform no real function, but can be easily replaced by more complex connection objects, for example, conferencing and monitoring if such is required.

Figure 35:
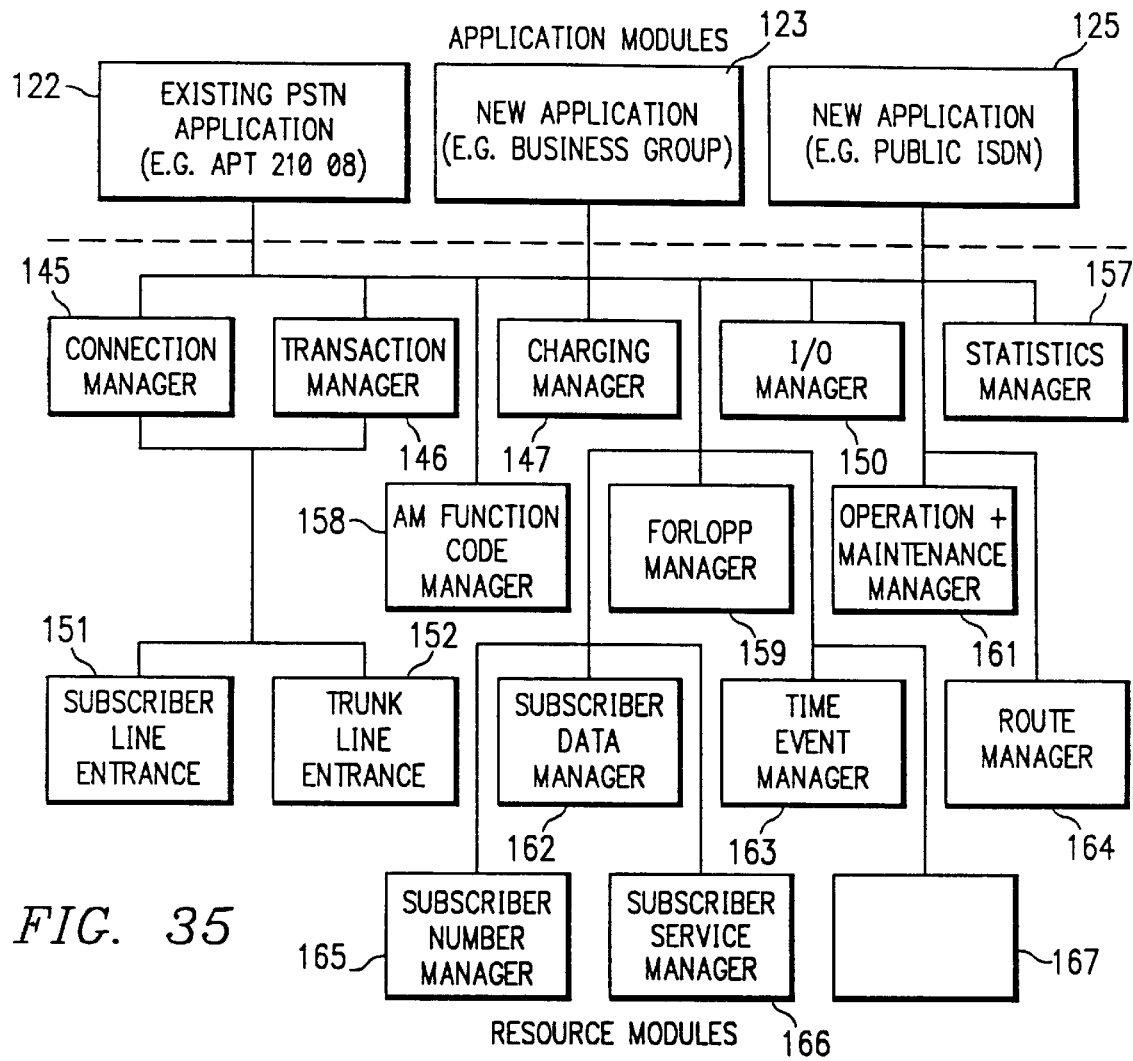
FIG. 35 is a block diagram of application modules and a connection manager resource module within the system of the present invention.

Referring next to FIG. 35, there is shown a group of application modules 122–125, together with a number of representative resource modules which may form one embodiment of the system of the present invention. For example, the connection manager resource module 145 and transaction manager resource module 146 form part of the resource module array by providing the essential functions of communication and connection between and with the application modules 122–125. The subscriber line entrance 151 and trunk line entrance 152 are associated with each of the connection resource module 145 and transaction resource module 146. In addition, there is shown a charging manager resource module 147 which performs charging functions which are common to two or more of the application modules. An I/O manager resource module 150 provides input/output functions while a statistics manager resource module 157 provides traffic recording and other statistics measurement and management functions. An application module function code manager 158 provides function code management, while a forlopp manager 159 provides forlopp restart functions necessary within any of the application modules or within the system as a whole if necessary. An operation and maintenance manager 161 provides the traditional operation and maintenance functions. A subscriber data manager 162 manages data associated with individual subscribers which are common to two or more application modules, including a subscriber number manager 165 and a subscriber service manager 166. A time event manager 163 provides services associated with the monitoring of certain time oriented functions within the system while a route manager 164 provides network route management functions. Manager 167 represents numerous other functions, such as sending/receiving messages by employing particular types of signaling, load management, and output information management, which could be incorporated within resource modules as necessary to provide the service functions to two or more application modules.

Figure 36:
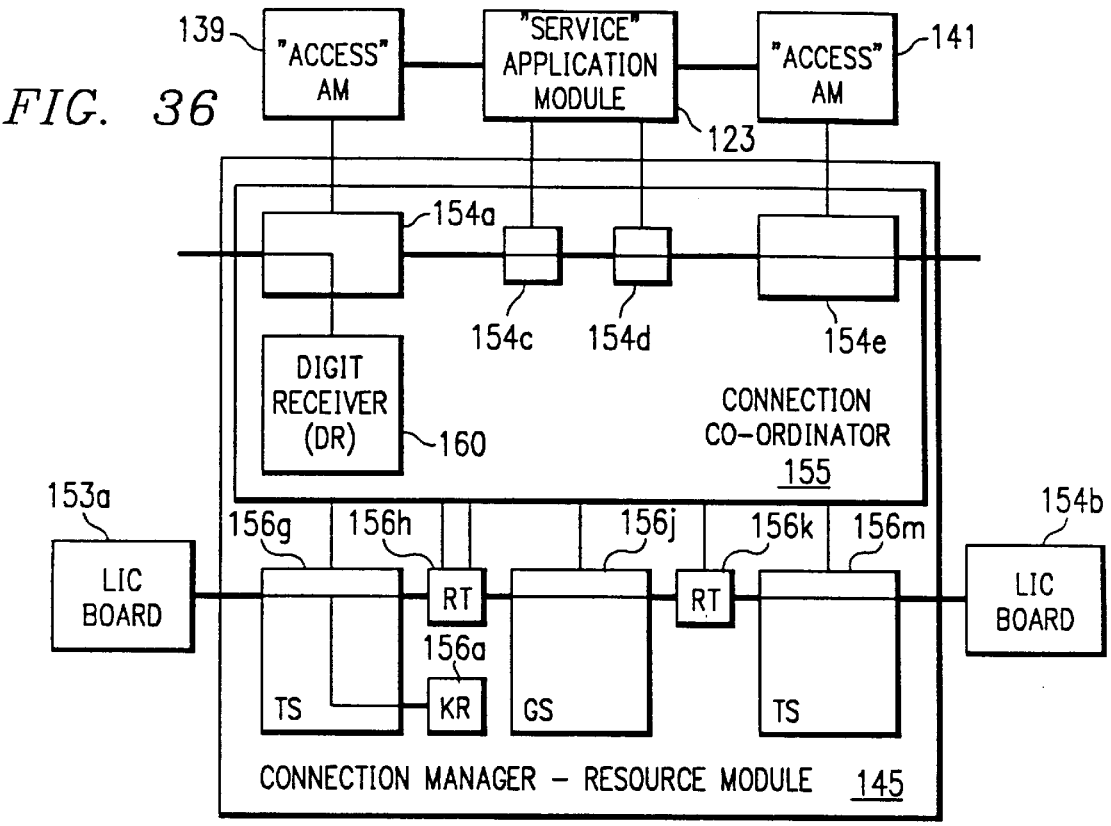
FIG. 36 is a block diagram illustrating another aspect of the relationship between application modules and the connection manager resource module within the system of the present invention.

Referring now to FIG. 36, there is shown another aspect of the function of the connection manager resource module 145 and its role within the system of the present invention. As indicated, each of the access application modules 139 and 141 as well as the service application module 123 are given logical switch objects 154a–154e with which they deal within the connection coordinator portion 155. One logical switch object 154 associated with the access application module 139 may be related to a digit receiver 160, for example. Each of the logical switch objects 154a–154e within the connection coordination portion 155 of the connection manager resource module 145 is associated with switch hardware. For example, time switches 156g and 156m are associated with each of the respective LIC boards 153a and 154a which are in turn associated with a group switch 156j through remote terminals 156h and 156k. A key set receiver 156a may be associated with either of the time switches 156g and 156m. Thus, the logical switch objects viewed by each of the application modules are related to switch hardware within the connection manager resource module 145.

Figure 37:
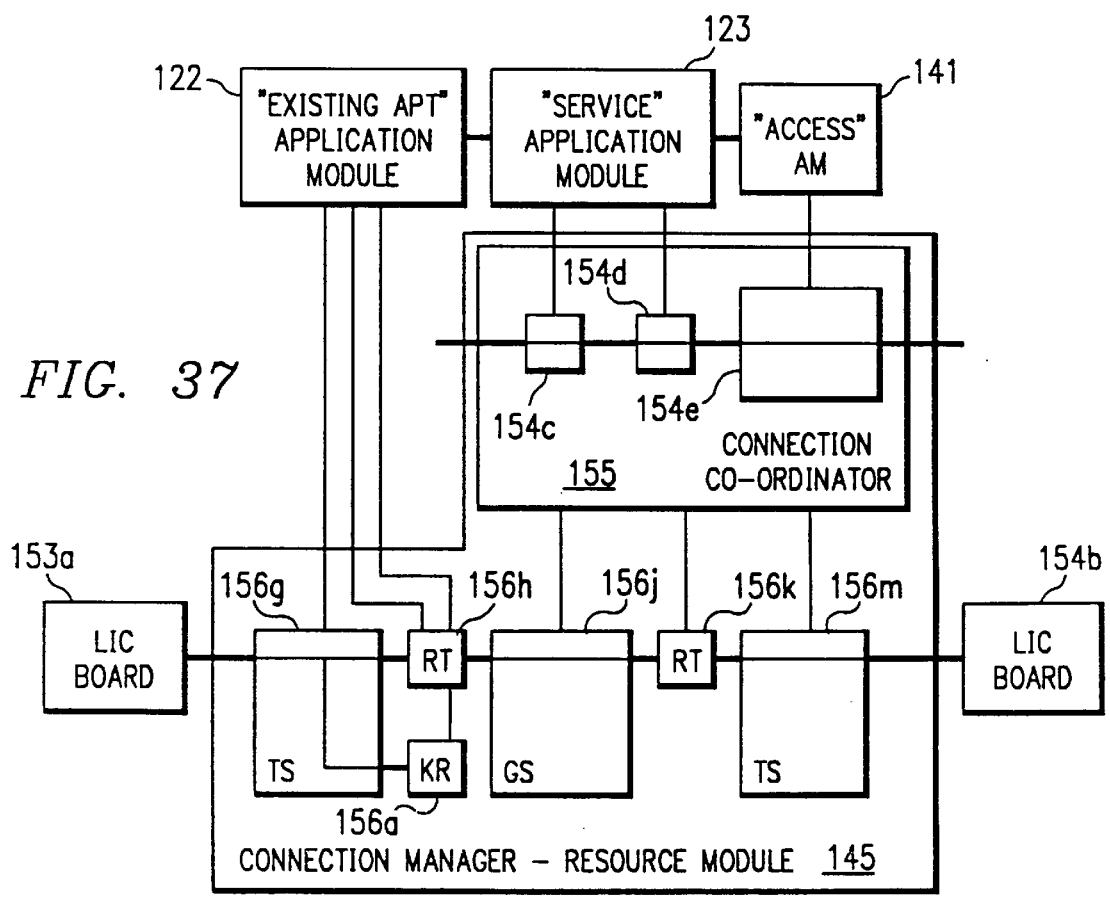
FIG. 37 is a block diagram illustrating the relationship between existing and new application modules and the connection manager resource module within the system of the present invention.

Referring now to FIG. 37, it is illustrated how existing APT application modules, such as the existing PSTN application module 122, may be used in the architecture of the present invention in cooperation with new service application modules 123 without modification. One of the significant advantages of the application modularity concepts inherent in the system of the present invention is that of backward compatibility with existing telecommunications applications. That is, the existing PSTN application module 122 can be constructed from an existing PSTN software module thereby reusing existing resources and investments and enabling existing systems to continue to function in an uninterrupted manner while new functionality is being added. For example, the PSTN application module 122 can be constructed by adding to an existing PSTN software module the network protocols required to enable communication between it and other application modules along with the interfaces required to enable it to communicate with the resource modules which provide the common services necessary for it to provide PSTN communications. One way in which the interfaces required for communications with resource modules can be added to an existing software package is by adding an emulator to the program to change the existing interfaces to the hardware into the form required to communicate with the resource modules. Additional PSTN functionality can then be added to the newly created PSTN application module as desired to enhance its abilities to provide PSTN services to subscribers. As shown in FIG.

37, the connection manager resource module 145 includes the connection coordinator 155 which defines logical switch objects 154c–154e for the new service application module 123 and the access application module 141. The hardware units comprising the time switches 156g and 156m and the group switch 156j interface with both the existing application module 123 as well as the "new" application modules 123 and 141. To interface with the existing APT application module 122, the connection coordinator 155 intercepts the group switch interface which is used to control a logical switch object representing the group switch. This allows the other application module's logical switch objects to interface the group switch object controlled by the existing APT software. The time switch and remote terminal/juncture terminal of the subscriber switch and all the pool devices (KR, DMJ, ASM, ECT) are controlled by the existing APT as before, using the existing interfaces. This also allows the use of the analog subscriber stage (SS, AJ, BJ, etc.) without further modification and enables the integration of existing APT application module software within the architecture of the present invention without additional modifications.

Figure 38:
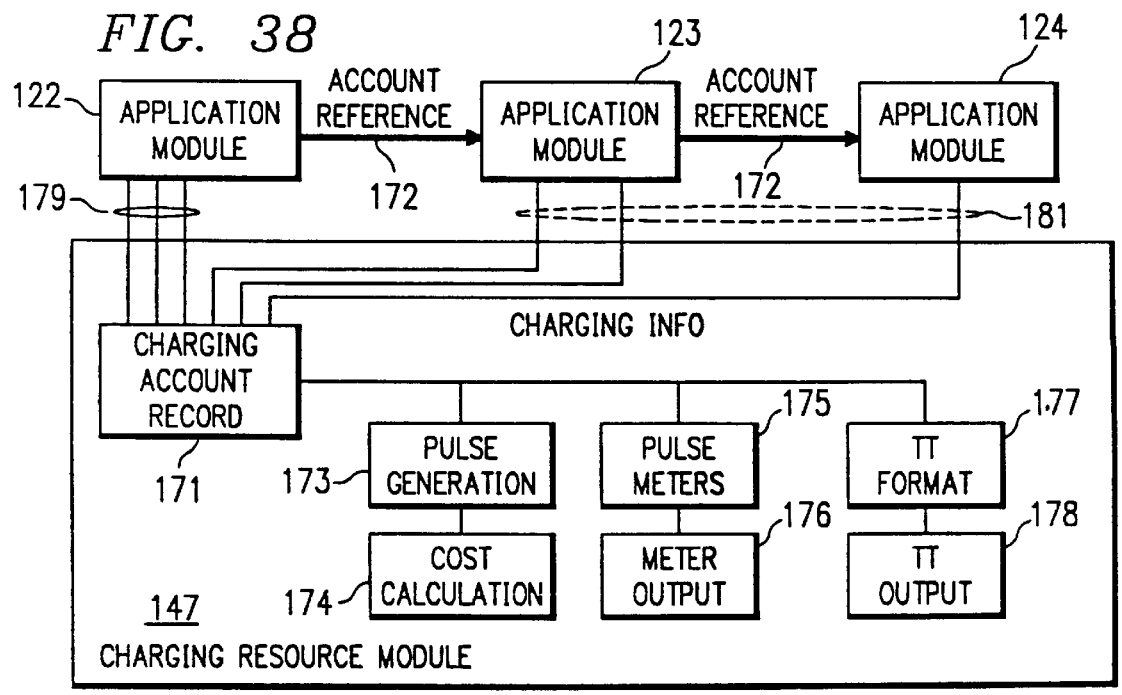
FIG. 38 is a block diagram illustrating the function of a charging manager resource module within the system of the present invention.

Referring next to FIG. 38, there is shown an illustration of the way the existing APT application modules 122 as well as the "new" application modules 123 and 124 interface with the charging resource module 147. As illustrated, the charging resource module 147 includes a charging account record 171 in which charging information from each of the application modules 122–124 is received and account reference information which is passed from one application module to the other. The charging account record 171 is coupled to other subsystems which include a pulse generation subsystem 173, and a cost calculation subsystem 174. Pulse meters 175 are linked with meter outputs 176, while toll ticketing format subsystems 177 are connected with a toll ticketing output 178. Thus, the charging resource module 147 provides the necessary servicing functions to provide charging functionality to both existing APT application modules 122 via existing interfaces 179 as well as new application modules 123 and 124 via new interfaces 181. In operation of the charging resource module 147, it contains functions for data collection, formatting and output as well as meter pulse generation, meter storage and output. Charging analysis and determination of the information to be output is performed by the application modules 122–124 themselves. For each new chargeable event, an account record is seized within the application module by charging account record subsystem 171. The account reference 172 to the account record 171 can then be used by this and other application modules to store data related to the charging of a particular call or event. If required, meter pulses can be generated in real time or calculated at the end of the call based upon the charging information received from the application modules 122–124. At the end of a call, a cost calculation can be performed on either the number or meter pulses. This can be used for output to a subscriber's charging account record as required.

Referring next to FIG. 39, there is shown a way in which various telecommunications services may be divided into respective application modules in accordance with the functionality associated with that particular telecommunication service and thereafter, subdivided into products and thence into software packages for distribution to customers. In FIG. 39, a plurality of communication services, such as PSTN 261, ISDN 262 and PLMN (mobile) 263 can be further subdivided into functional units. For example, with regard to requirements, the PSTN 261 may include local PSTN 261a, transit PSTN 261b and international PSTN 261c. Similarly, ISDN may be further subdivided into local ISDN 262a and international ISDN 262b. PLMN 263 may be further subdivided into base site controller requirements 263a, mobile switching center requirements 263b and GMSC 263c. Having defined the basic requirements in telecommunication services, it now remains to design the functionality required for those services into a plurality of application modules 271. For example, each of the requirements of 261a–261c may be incorporated into a single PSTN application module 272, while a local ISDN requirement 261A may be incorporated into either an ACC application module 273 or an N-ISDN application module 274. The international ISDN requirement 262b is incorporated to an international ISDN application module 275. The requirement of a base site controller 262a and a mobile switching center 263b are incorporated into a base site controller application module 276 while certain other requirements are incorporated into an MUS application module 277. Similarly, both the MSC requirement 263b and the GMSC requirement 263c can be incorporated to an MNS application module 278, as well as a home location register (HLR) application module 279. Each of the application modules 272–279 can then be organized into blocks 281 and then further subdivided as products 282; which are, in turn, packaged in the form of individual software units 283 for distribution to the customer.

As can be seen from the above description of the application modularity architecture of the present invention, the present system proposes numerous advantages and features enabling the efficacious growth of future communication services.

It is thus believed that the operation and construction of the present invention will be apparent from the foregoing description. While the method, apparatus and system shown and described has been characterized as being preferred, it will be obvious that various changes and modification scan be made therein without departing from the spirit and scope of the invention as defined in the following claims.

What is claimed is:

1. A telecommunications node for providing telecommunications services within a telecommunications network, comprising:

a plurality of application modules, one or more of said modules functioning as a logical telecommunications node to provide telecommunications services and to serve as a particular type of discrete telecommunications node connected to said telecommunications network;

a plurality of resource modules, each of said resource modules being associated with a particular one or more of said application modules for providing hardware and software resource support for implementing the telecommunications services of said logical telecommunications node;

a communications protocol associated with each of said application modules for communicating data between said applications modules, said communications protocol being compatible with standardized communications protocols recognizable by said particular type of discrete telecommunications node; and wherein a first application module of said plurality of application modules is configured so that said first application module may communicate with another application module using said communications protocol without regard as to whether said another application module is located within said telecommunications node.

2. The telecommunications node of claim 1 wherein one of said plurality of application modules functions as a logical node within a Public Switched Telephone Network PSTN.

3. The telecommunications node of claim 2 wherein said communications protocol comprises integrated service user part ISUP based signals.

4. The telecommunications node of claim 2 wherein said communications protocol comprises Transaction Capable Application Part TCAP based signals.

5. The telecommunications node of claim 1 wherein said logical node comprises a local exchange.

6. The telecommunications node of claim 1 wherein one of said plurality of application modules functions as a logical node within a Public Land Mobile Network PLMN.

7. The telecommunications node of claim 6 wherein said logical node comprises a mobile switching center MSC.

8. The telecommunications node of claim 6 wherein said logical node comprises a home location register HLR.

9. The telecommunications node of claim 6 wherein said communications protocol comprises Mobile Application Part MAP based signals.

10. A system for providing a plurality of telecommunications services usually being offered by a plurality of different telecommunications nodes within a single telecommunications node, comprising:

a plurality of application modules, each application module comprising all of the necessary software applications for providing one or more of said telecommunications services and thereby serving as a particular type of logical telecommunications node;

a plurality of hardware and software resources accessible by said application modules for implementing said plurality of telecommunications services;

a plurality of resource modules, each providing an interface between each of said plurality of application modules and one or more of said plurality of hardware and software resources necessary for implementing said telecommunications services associated with each of said application modules;

a communication link accessible to said application modules, said communication link utilizing one or more of said plurality of resource modules to communicate data between said application modules and capable of transporting data formatted in accordance with standard telecommunications signal protocols recognizable by said logical telecommunications nodes; and wherein said plurality of application modules are configured so that communications using at least one of said standard telecommunications signal protocols between two application modules may be completed without regard for whether said two application modules are both located within said telecommunications node.

11. The system of claim 10 wherein said particular type of logical telecommunications node comprises a wireline telecommunications exchange within a Public Switched Telephone Network PSTN and wherein an individual application module provides telecommunications service associated with said wireline telecommunications exchange.

12. The system of claim 11 wherein said communication link is capable of transporting Integrated Service User Part ISUP based signals between said application modules.

13. The system of claim 10 wherein said particular type of logical telecommunications node comprises a mobile switching center MSC within a Public Land Mobile Network PLMN and wherein an associated individual application module provides telecommunications service associated with said MSC.

14. The system of claim 13 wherein said communication link is capable of transporting Mobile Application Part MAP based signals between said application modules.

15. The system of claim 14 wherein a particular resource module associated with said associated individual application module interfaces with a base station controller for providing mobile service.

16. The system of claim 10 wherein said particular type of logical telecommunications node comprises an Integrated Service Digital Network ISDN switch within an ISDN telecommunications network and wherein an associated individual application module provides telecommunications service associated with said ISDN switch.

17. The system of claim 16 wherein a particular resource module associated with said associated individual application module interfaces with ISDN channels for communicating ISDN data.

18. A method for controlling a stored program controlled telecommunications switching exchange to provide service to a plurality of users having diverse communications applications among them, said method comprising:

storing within the software of said exchange a plurality of application modules, each application module containing the control instructions and associated with data for providing communication services of a particular application type and each module being capable of acting as a telecommunication node within a telecommunications network;

storing within the software of said exchange a plurality of resource modules, each resource module being capable of communicating with each of said application modules and having access to and control over the relevant hardware components of the exchange necessary for performing the specific functional actions required to implement its assigned service elements;

providing communications between nodes comprising each of said application modules and each other application module and each resource module to enable the telecommunications services of each application module to be provided to said users without use of the control instructions or data of any other application module; and wherein said plurality of application modules are configured so that any one of said plurality of application modules may be altered without modifying any other one of said plurality of application modules.

19. The method of controlling a stored program controlled telecommunications switching exchange to provide service to a plurality of users having diverse communications applications among them as set forth in claim 18 in which said communications providing steps includes:

providing a first protocol for the transfer of information between application modules located within the same exchange; and providing a second protocol for the transfer of information between application modules located in different exchanges, said second protocol being capable of identifying specific physical circuit connections.

20. The method for controlling a stored program controlled telecommunications switching exchange to provide service to a plurality of users having diverse communications applications among them as set forth in claim 18 in which each application module acts as a virtual switch within a network.

21. A telecommunications exchange for providing a plurality of telecommunications services to telecommunications users, comprising:
- a first group of application modules stored within the software of said telecommunications exchange for functioning as a first logical telecommunications node and for providing telecommunications services associated with said first logical telecommunications node;
- a second group of application modules stored within the software of said telecommunications exchange for functioning as a second logical telecommunications node and for providing telecommunications service associated with said second logical telecommunications node;
- a plurality of resource modules, each of said resource modules being associated with a particular one or more of the application modules of said first and second group of application modules for providing hardware and software resource support for implementing the telecommunications services associated with said first and second logical telecommunications nodes;
- a communications protocol for communicating data between said first group of application modules and said second group of application modules wherein said data are formatted and transported in accordance with at least one standard telecommunications signal protocol recognizable by said first and second logical telecommunications nodes; and
- wherein said first and second group of application modules are configured so that said first group of application modules may be altered without modifying said second group of application modules.

22. The telecommunications exchange of claim 21 wherein said first logical telecommunications node represented by said first group of application modules comprises a wireline local exchange within a Public Switched Telephone Network PSTN.

23. The telecommunications exchange of claim 22 wherein said data are formatted in accordance with a Transaction Capability Application Part TCAP protocol.

24. The telecommunications exchange of claim 21 wherein said second logical telecommunications node represented by said second group of application modules comprises a wireless telecommunications node within a Public Land Mobile Network PLMN.

25. The telecommunications exchange of claim 24 wherein said data are formatted in accordance with a Mobile Application Part MAP protocol.

* * * * *